(12) United States Patent  (10) Patent No.: US 7,631,135 B2
Kubo et al. (45) Date of Patent: Dec. 8, 2009

(54) PROCESSOR ACCESS CONTROL DEVICE

(75) Inventors: Keijirou Kubo, Fukuoka (JP); Jun Ohtsuka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 11/710,557

(22) Filed: Feb. 26, 2007

(65) Prior Publication Data

US 2007/0214302 A1 Sep. 13, 2007

(30) Foreign Application Priority Data

Mar. 13, 2006 (JP) .............................. 2006-066943

(51) Int. Cl.
*G06F 13/14* (2006.01)
(52) U.S. Cl. ........................ 710/305; 710/112; 710/309
(58) Field of Classification Search ......... 710/107–119, 710/309–313
See application file for complete search history.

(56) References Cited

U.S. PATENT DOCUMENTS 6,704,821 B2 * 3/2004 Scandurra et al. ........... 710/243
7,149,828 B2 * 12/2006 Hayashi et al. ............. 710/120
7,162,557 B2 * 1/2007 Takeda et al. ............... 710/240

OTHER PUBLICATIONS

Patent Abstracts of Japan, Publication No. 06-309276, Published Nov. 4, 1994.
Patent Abstracts of Japan, Publication No. 2001-167076, Published Jun. 22, 2001.

* cited by examiner

*Primary Examiner*—Raymond N Phan
(74) *Attorney, Agent, or Firm*—Fujitsu Patent Center

(57) ABSTRACT

A data processing device with an efficient mechanism for controlling bus priority of multiple processors. The device has a data memory that is accessible to the processors via each processor's individual control bus and a common control bus. A bus selector is disposed between the individual control buses and the common control bus and controlled by a bus arbiter that resolves bus requests on the individual control buses from the processors attempting access to the data memory. The bus arbiter sends a selection command to the bus selector, thereby permitting a specified processor to reach the data memory. A bus monitor counts bus requests and conflicts between them, determines priority of each processor attempting access to the data memory according to the count results, and sends a wait command signal to low-priority processors so as to delay their access to the data memory.

14 Claims, 21 Drawing Sheets

| NUMBER OF PROGRAM LOAD ACCESSES | BUS ACCESS PRIORITY FOR PROGRAM LOADING | CACHE MISS |
|---|---|---|
| LARGE<br>\|<br>SMALL | LOW<br>\|<br>HIGH | LESS LIKELY<br>\|<br>LIKELY |

FIG.21

PROCESSOR ACCESS CONTROL DEVICE

CROSS-REFERENCE TO RELATED APPLICATIONS

This application is based upon and claims the benefits of priority from the prior Japanese Patent Application No. 2006-066943, filed on Mar. 13, 2006, the entire contents of which are incorporated herein by reference.

BACKGROUND OF THE INVENTION

1. Field of the Invention

The present invention relates to a data processing device, and more particularly to a data processing device that performs computational operations with a system of multiple processors.

2. Description of the Related Art

Multiprocessor systems employ a plurality of processing elements to perform computational operations. Because of limitations in the number of memory devices that can be mounted, as well as to meet the cost requirement, many of such multiprocessor systems use an architecture where processors exchange data with each other through a single shared memory. While the shared data memory may receive two or more concurrent access requests, this system architecture allows only one processor to reach the memory at a time. A bus arbitration mechanism is thus employed in the system to resolve such memory access conflicts and serve the requesting processors in an orderly fashion.

One typical arbitration method is known as a rotating priority scheme, in which all processors are served with equal priority. Another typical method is a fixed priority scheme, in which each processor is assigned a different priority level for determining the order of data memory access when a contention occurs. Those arbitration methods are, however, inflexible in terms of access priority manipulation. Also, even a high-priority processor has to wait until the end of an ongoing memory access session that is performed by another processor with a lower priority. This could produce frequent "stalls" (i.e., the state where the processor is unable to execute the next instruction) if many access requests were concentrated to the data memory.

Yet another bus arbitration method is proposed in Japanese Patent Application Publication No. 6-309276 (1994), paragraph Nos. 0006 and 0007 and FIG. 1. To control bus requests, the proposed method uses a variable ID code that changes each time a new bus request signal is issued. This method, however, provides no specific solutions for the problem of stalls (e.g., by reducing memory access cycles). It also lacks the ability to shorten the duration of memory access, thus leading to inefficient data processing.

Many multiprocessor systems have a cache memory for each processor to enable high-speed access to program instructions. That is, the instruction codes stored in a relatively slow, large-capacity code memory are transferred to a small fast cache memory, so that the processor can read and execute them at a high speed. This memory-to-memory transfer operation is referred to as a program loading operation, which occurs upon "cache miss," i.e., when a required code is missing in the cache memory. That is, the conventional multiprocessor systems trigger a program loading process on an after-the-fact basis, lacking mechanisms for reducing the chance of cache miss. This leads to an increased time of instruction fetching and consequent performance degradation.

SUMMARY OF THE INVENTION

In view of the foregoing, it is an object of the present invention to provide a data processing device with improved processing efficiency.

To accomplish the above object, the present invention provides a data processing device having the following elements: a plurality of processors that perform computational operations, a data memory storing data required for the computational operations, a plurality of individual control buses extending from the respective processors toward the data memory, and a common control bus connected to the data memory. To control those elements, the data processing device also includes a bus selector, a bus monitor, and a bus arbiter. The bus selector is disposed between the individual control buses and the common control bus and connects the common control bus selectively with one of the individual control buses that is specified by a given selection command. The bus arbiter resolves bus requests on the individual control buses from the processors attempting access to the data memory and sends a selection command to the bus selector. The bus monitor counts bus requests and conflicts between them and determines priority of each processor attempting access to the data memory according to the count results. When two or more processors request access to the data memory, the bus monitor sends a wait command signal to low-priority processors so as to delay their access to the data memory.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 21 shows relationships between the frequency of program load access, bus access priority for individual program loading, and likelihood of cache miss.

DESCRIPTION OF THE PREFERRED EMBODIMENTS

Figure 1:
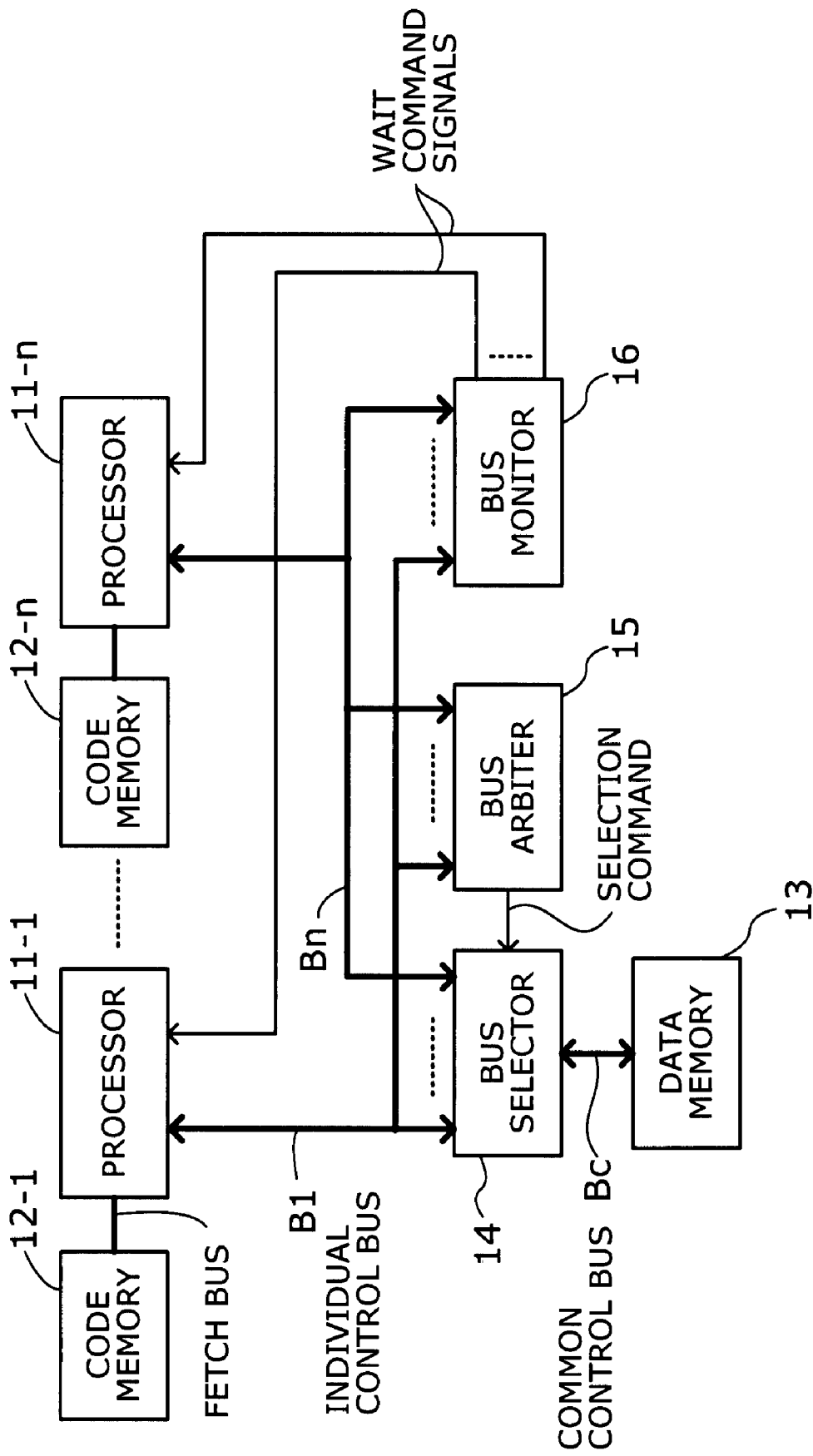
FIG. 1 is a conceptual view of a data processing device according to a first embodiment of the present invention.

Preferred embodiments of the present invention will be described below with reference to the accompanying drawings, wherein like reference numerals refer to like elements throughout.

FIG. 1 is a conceptual view of a data processing device according to a first embodiment of the present invention. The illustrated data processing device 10 operates as a multiprocessor system formed from a plurality of processors 11-1 to 11-*n*, code memories 12-1 to 12-*n*, a data memory 13, a bus selector 14, a bus arbiter 15, and a bus monitor 16.

The processors 11-1 to 11-*n* execute pipelined processing while decoding each given instruction. Each processor 11-1 to 11-*n* is coupled to a code memory 12-1 to 12-*n* through a dedicated fetch bus. Those code memories 12-1 to 12-*n* store instruction codes for the respective processors 11-1 to 11-*n*. An instruction code includes an opcode (operation code) specifying the operation to be performed, one or more operands specifying what data the operation should act upon, and access address specifying a reference to the data memory 13. The data memory 13 stores data necessary for computational operation.

The bus selector 14 is disposed between the processors 11-1 to 11-*n* and data memory 13 to connect one of the individual control buses B1 to B*n* with a common control bus Bc for use by the processor 11-1 to 11-*n* attempting access to the data memory 13. The bus selector 14 makes this selection in accordance with a selection command from the bus arbiter 15, thereby permitting a specified processor to have access to the data memory 13.

The bus arbiter 15 resolves multiple bus requests on the individual control buses B1 to B*n* from the processors 11-1 to 11-*n* and sends a specific selection command to the bus selector 14. The bus monitor 16, on the other hand, monitors activities on the individual control buses B1 to B*n*, counting bus requests and their conflicts. The bus monitor 16 uses the count results to determine the priority of each processor 11-1 to 11-*n* attempting access to the data memory 13. The bus monitor 16 sends a wait command signal to low-priority processors so as to delay their access to the data memory 13.

Figure 2:
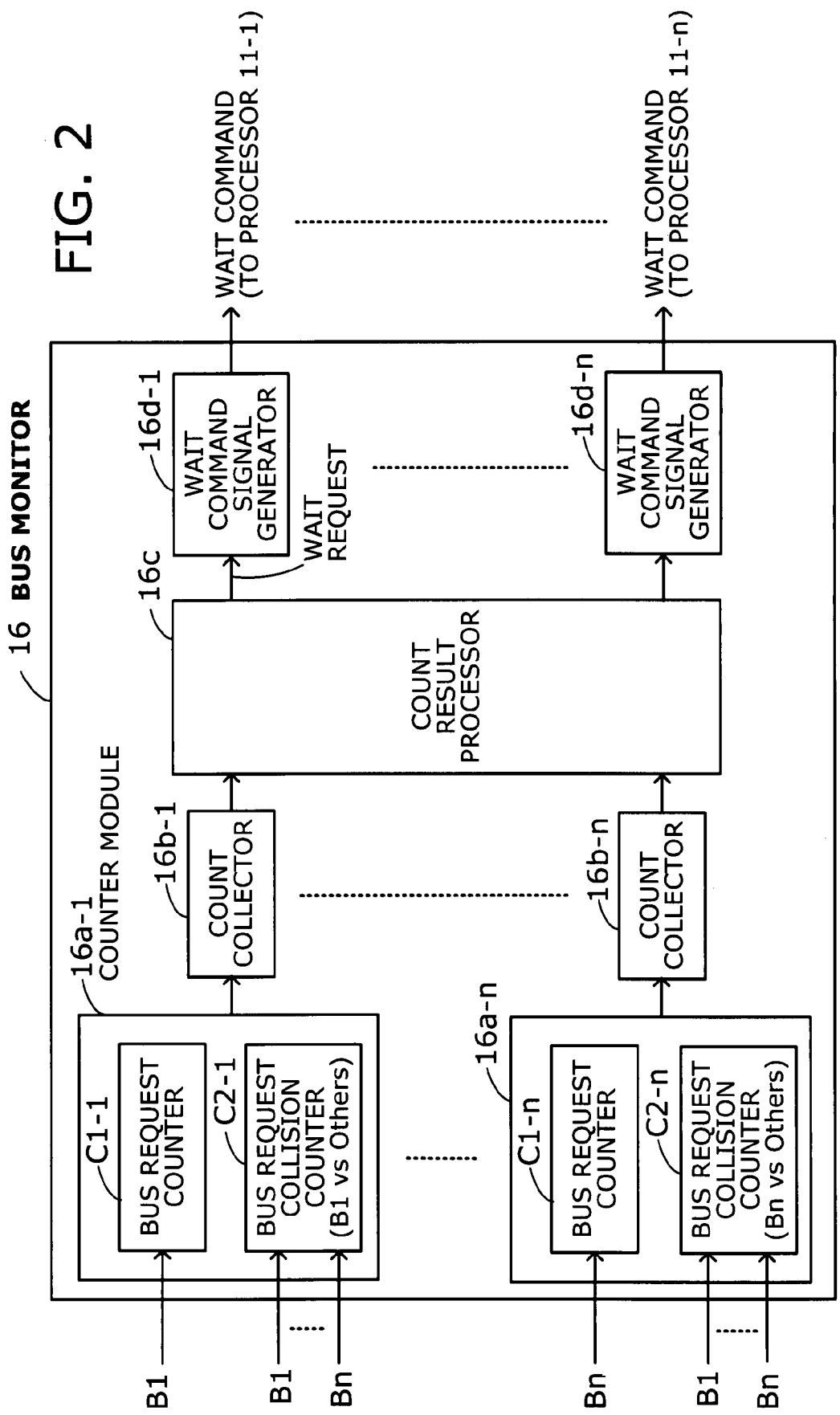
FIG. 2 shows the structure of a bus monitor.

FIG. 2 shows the structure of the bus monitor 16. As seen, the bus monitor 16 is formed from a plurality (n) of counter modules 16*a*-1 to 16*a*-*n*, their corresponding count collectors 16*b*-1 to 16*b*-*n*, a count result processor 16*c*, and a plurality of wait command signal generators 16*d*-1 to 16*d*-*n*. Each of the counter modules 16*a*-1 to 16*a*-*n* contains a bus request counter C1-1 to C1-*n* and a bus request conflict counter C2-1 to C2-*n*. The first bus request counter C1-1 watches the first individual control bus B1 to count bus requests from the first processor 11-1 and outputs the resulting count for each unit time interval. Likewise, the nth bus request counter C1-*n* watches the nth individual control bus B*n* to count bus requests from the nth processor 11-*n* and outputs the resulting count for each unit time interval.

The bus request conflict counters C2-1 to C2-*n* are coupled to every individual control bus B1 to B*n* to monitor bus requests for the data memory 13. Specifically, the bus request conflict counter C2-1 counts conflicts of bus requests between the first individual control bus B1 and the other individual control buses B2 to B*n*, thus outputting the count result for each unit time interval. For example, the bus request conflict counter C2-1 increments the conflict count when it observes bus requests on two individual control buses B1 and B2 during a particular unit time period. Likewise, the nth bus request conflict counter C2-*n* counts conflicts of bus requests between the nth individual control bus B*n* and the other individual control buses B1 to B*n*-1 and outputs the count result for each unit time interval.

The counter modules 16*a*-1 to 16*a*-*n* send the above count values to their corresponding count collectors 16*b*-1 to 16*b*-*n*. The count collectors 16*b*-1 to 16*b*-*n* collect the number of bus requests and that of bus request conflicts for each individual control bus B1 to B*n* (or for each processor 11-1 to 11-*n*). The count result processor 16*c* determines priority of each processor by comparing the collected count results. Specifically, the count result processor 16*c* gives a higher priority if the processor in question issues many bus requests and encounters many conflicts. It in turn gives a lower priority if the processor issues a small number of bus requests and encounters a fewer conflicts. The count result processor 16*c* then identifies the lowest-priority processor and sends its corresponding wait command signal generator 16*d*-1 to 16*d*-*n* a wait request, which causes the receiving wait command signal generator 16*d*-1 to 16*d*-*n* to issue a wait command signal to the lowest-priority processor. Suppose, for example, that the first processor 11-1 is found to be of the lowest priority. In this case, the count result processor 16*c* sends a wait request to the first wait command signal generator 16*d*-1, thus causing a wait command signal to be issued to the first processor 11-1.

Suppose now that the nth processor 11-*n* is determined to be of the highest priority. Since it receives no wait requests, the highest-priority processor attempts to make access to the data memory 13 in an ordinary way. By monitoring request signals on the individual control buses B1 to B*n*, the bus arbiter 15 recognizes which processor is requesting memory access, thus notifying the bus selector 14 of which bus to select. In the present case, the bus selector 14 enables the nth individual control bus B*n* corresponding to the requesting processor 11-*n* to connect with the common control bus Bc. This allows the processor 11-*n* to have access to the data memory 13.

Figure 3:
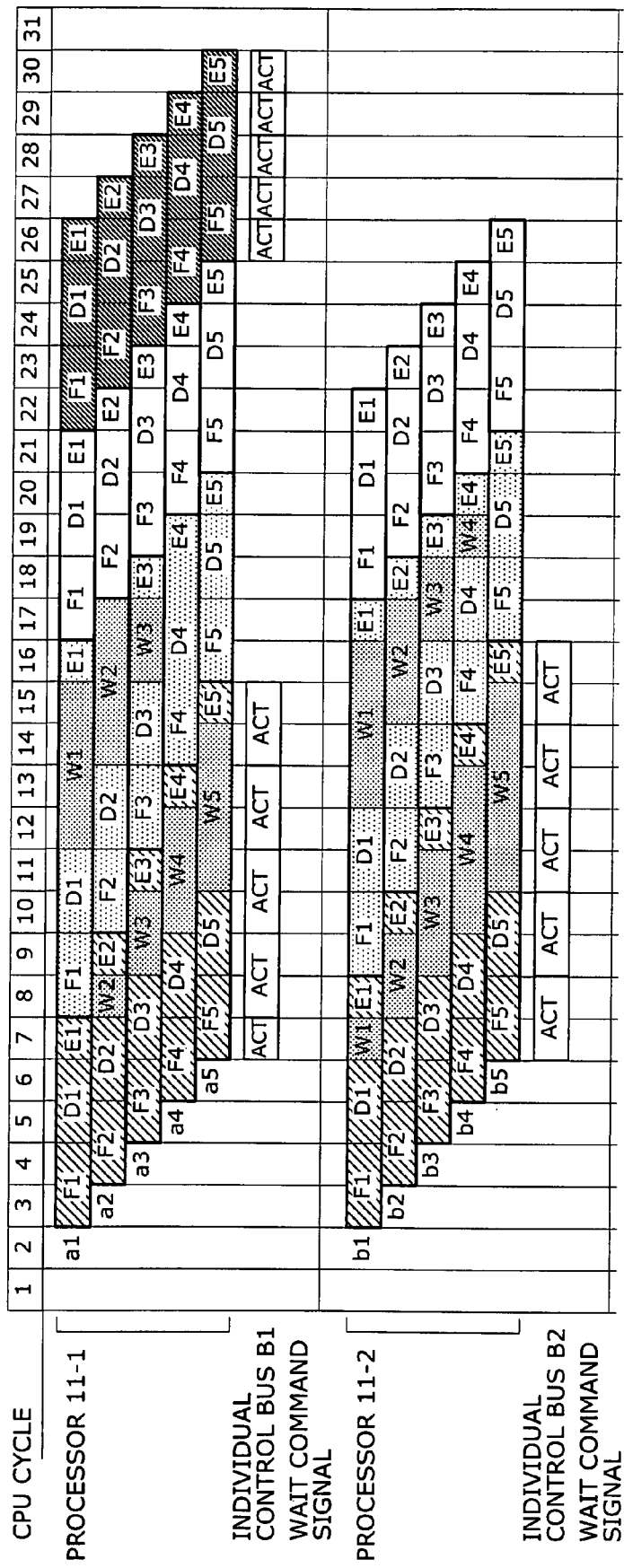
FIG. 3 is a timing diagram showing an example of pipelined processing.

Referring to the timing diagram of FIG. 3, an example of pipelined processing is shown. The upper half of this timing diagram shows pipeline operation of the first processor 11-1, while the lower half shows that of the second processor 11-2. FIG. 3 illustrates a situation where conflicts of memory access requests occur frequently. The data processing device 10 of the first embodiment alleviates this situation, as will be described later in FIG. 4.

Pipelined processing is a technique of enhancing the performance of a computer system by dividing each instruction operation into multiple time-staggered stages and executing them in a parallel fashion. In general, a pipelined processor executes an instruction as the following three phases of operation:

(a) Instruction fetch (F): read out a processor instruction from code memory and load it to the instruction register of the processor (b) Decode (D): parse the fetched instruction and determine how the processor should act (c) Execute (E): manipulate register files, make access to peripheral memory (including the data memory 13), and/or perform an arithmetic operation on the specified data in registers, according to the result of instruction decoding The timing diagram of FIG. 3 assumes a five-stage pipeline with a fetch latency of two cycles and a decode latency of two cycles. The term "latency" refers to a delay time of a particular operation. For example, fetch latency=2 means that it takes two CPU cycles to fetch an instruction code.

As can be seen from, for example, cycles 22-26 on the first row a1 in the upper half of FIG. 3, one instruction is executed as a series of three pipelined operations (F1 in cycles 22 and 23, D1 in cycles 24 and 25, and E1 in cycle 26) when no conflicts are present. The second to fifth rows a2 to a5 show that the subsequent instructions (F2, D2, E2) to (F5, D5, E5) are executed in the same sequence as the first row a1, but each with a delay of one cycle relative to the preceding instruction. The pipelined processing proceeds in this way, performing the fetch, decode, and execute operations for multiple instructions in a parallel fashion.

In the case where a conflict of memory access is present, it takes time for a requesting processor to complete its access to the memory, which sends the processor to a stall state where it is unable to proceed to the next instruction. This instruction stall produces a wait state of the pipelined processing; that is, it stops the pipeline so as not to violate the correct execution order of instructions. Referring to FIG. 3, the symbol "W" indicates a wait state caused by instruction stall. The pipeline enters to a wait state when an E-phase operation including access to the data memory 13 encounters a conflict with some other processor. As can be seen from FIG. 3, E-phase operations in different processors could occur at the same time, causing a bus request conflict if they include access to the data memory 13. In such a case, the processors failing to be granted the access right have to wait until the winner of the arbitration completes the access.

The following will describe in detail how the pipeline goes into a wait state in the context of the first embodiment of the invention. The description starts with cycle 7, where the second processor 11-2 encounters a conflict with the first processor 11-1.

(Cycle 7) The first processor 11-1 makes access to the data memory 13 (ACT) as part of operation E1 at stage a1. The second processor 11-2, on the other hand, intends to begin its operation E1 at stage b1. Since, however, the first processor 11-1 is granted an access right to the data memory 13 in its own E1. The second processor 11-2 is thus forced to enter to wait state W1 at stage b1.

(Cycle 8) The second processor 11-2 starts operation E1 at stage b1, with a delay of one cycle relative to its original timing. This delay at stage b1 influences the next stage b2, thus producing a wait state W2 at that stage b2. The first processor 11-1, on the other hand, intends to begin operation E2 at stage a2 in this cycle 8. However, because the second processor 11-2 is executing E1 at its stage b1, the stage a2 of the first processor 11-1 has to enter to a wait state W2.

(Cycle 9) The first processor 11-1 starts operation E2 at stage a2, with a delay of one cycle relative to its original timing. This delay at stage a2 influences the next stage a3 of the same processor 11-1, thus producing a wait state W3 at that stage a3. The second processor 11-2, on the other hand, intends to begin operation E2 at stage b2 in this cycle 9. However, because the first processor 11-1 is executing E2 at its stage a2, the stage b2 of the second processor 11-2 has to enter to a wait state W2. Stage b3 is also forced to enter to a wait state W3, instead of E3, since the first processor 11-1 is executing E2 at its stage a2.

(Cycle 10) The second processor 11-2 starts operation E2 at stage b2, with a delay of two cycles relative to its original timing. Stage b3 of the same processor 11-2 should further delay its operation E3, thus extending the wait state W3. Stage b4 is also forced to enter to a wait state W4, instead of executing operation E4, since the second processor 11-2 is executing E2 at its stage b2. Stage a3 of the first processor 11-1 is still unable to execute operation E3, thus continuing W3. Stage a4 of the processor 11-1 also has to wait as W4, instead of performing operation E4, since operation E2 is under way at stage b2. More wait states will be inserted in the subsequent cycles in a similar way.

The data processing device 10 of the first embodiment deals with the above-described situation of FIG. 3. Specifically, the proposed data processing device 10 observes the number of bus requests and the number of bus request conflicts. In the case of FIG. 3, the first processor 11-1 produces ten bus requests (i.e., ten ACT cycles on the individual control bus B1), and the second processor 11-2 produces five bus requests (i.e., five ACT cycles on the individual control bus B2). The data processing device 10 observes five conflicts between those requests from two processors 11-1 and 11-2 during the period of cycle 7 to cycle 16.

The data processing device 10 has a count result processor 16c to determine the priority of each processor based on the above findings. In the present example, the two processors are equal in the number of bus request conflicts, but the first processor 11-1 is given a higher priority since its bus requests outnumber those of the second processor 11-2. The first processor 11-1 will thus win an access right in the case of conflict.

Figure 4:
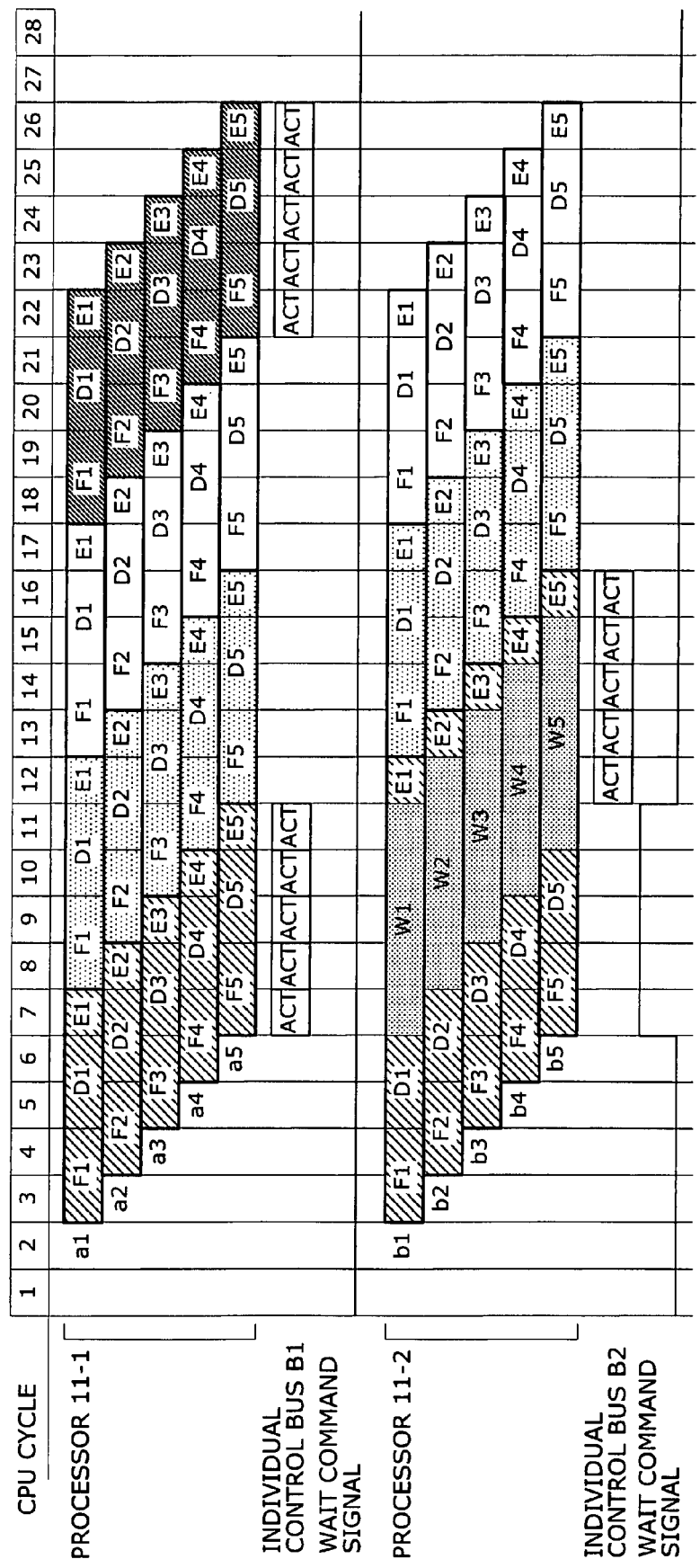
FIG. 4 is a timing diagram showing how the proposed data processing device operates according to the first embodiment.

FIG. 4 is a timing diagram showing how the proposed data processing device 10 operates, with emphasis on how its low-priority processor 11-2 is forced to wait. The upper half of this timing diagram shows pipeline operation of the first processor 11-1, while the lower half shows that of the second processor 11-2.

The count result processor 16c in the data processing device 10 determines that the second processor 11-2 be of lower priority, thus sending a wait request to the second wait command signal generator 16d-2 corresponding to the second processor 11-2. The second wait command signal generator 16d-2 then sends a wait command signal to the second processor 11-2. In the example of FIG. 4, it asserts the wait command signal for five consecutive cycles, from cycle 7 to cycle 11. The signal causes stage b1 of the second processor 11-2 to postpone its operation E1 from cycle 7 to cycle 12, so that a wait state of five cycles will be inserted to stage b1 of the second processor 11-2. This insertion of five wait cycles causes the subsequent stages b2 to b5 to wait five cycles in a time staggered manner before their respective operations E2 to E5 can be started.

The first processor 11-1, on the other hand, enjoys its high priority in its access to the data memory 13. That is, the first processor 11-1 can execute pipeline processing without wait, since the competing processor 11-2 enters to a wait state when a conflict occurs. It should be noted that the second processor 11-2 waits as a result of wait command signals, whereas the wait cycles that the first and second processor 11-1 and 11-2 experience in FIG. 3 are produced due to instruction stall.

As can be seen from the above description of the first embodiment, the wait command signal causes a low-priority processor to delay beginning its memory access. This means that the low-priority processor issues a bus request later than originally intended. During this time lag, a higher-priority processor can make access to the memory, with a reduced probability of bus request conflict.

Second Embodiment

Figure 5:
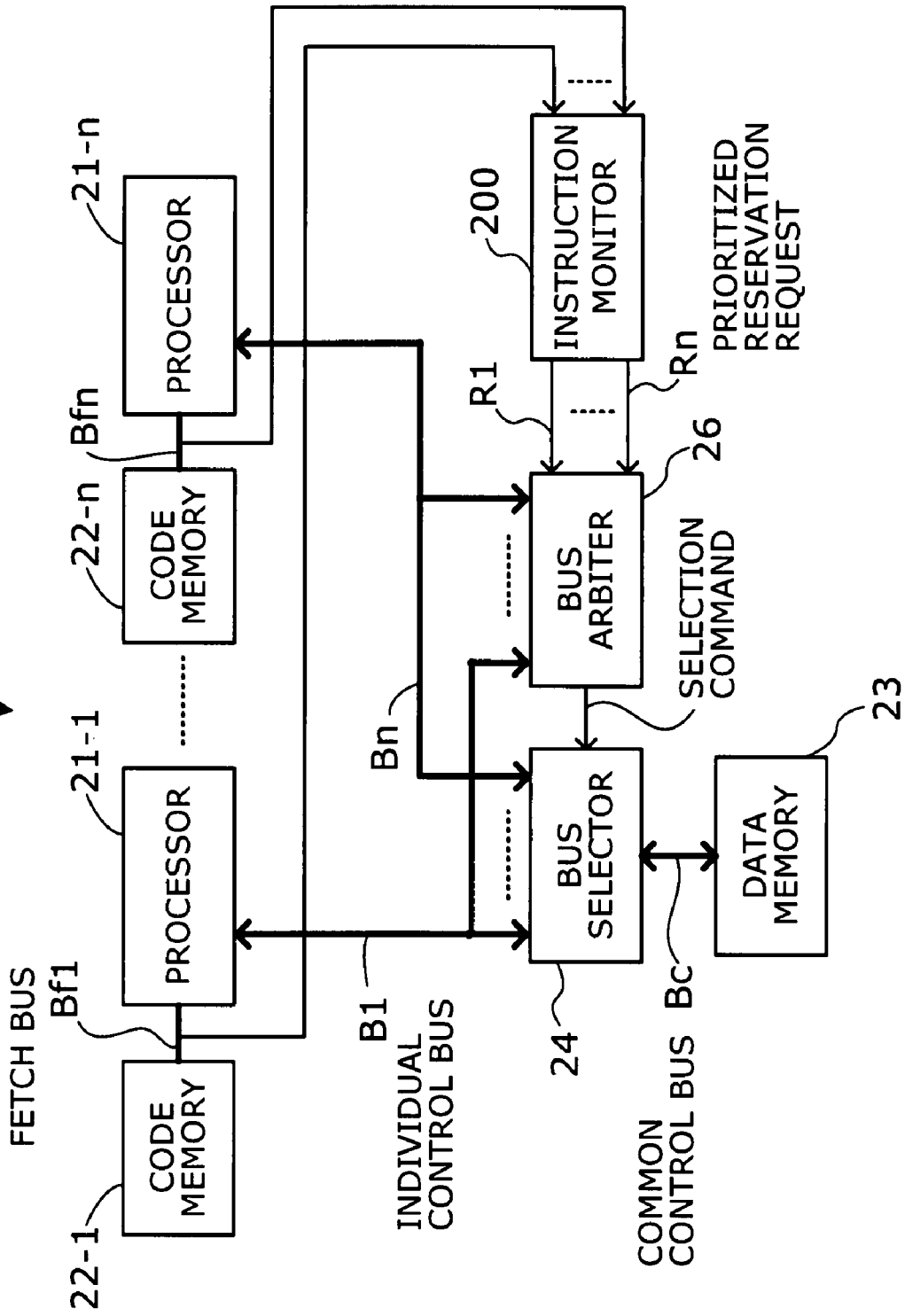
FIG. 5 shows the structure of a data processing device according to a second embodiment of the present invention.

Referring now to FIG. 5, this section describes a data processing device according to a second embodiment of the present invention. The data processing device 20 of FIG. 5 includes a plurality of processors 21-1 to 21-*n* and their corresponding code memories 22-1 to 22-*n*, a data memory 23, a bus selector 24, an instruction monitor 200, and a bus arbiter 26. The description will focus on the instruction monitor 200 and bus arbiter 26 since the other elements provide the same functions as their counterparts in the first embodiment shown in FIG. 1.

The instruction monitor 200 watches instruction fetch cycles on the fetch bus Bf1 to Bfn of each processor 21-1 to 21-*n* in order to obtain an opcode and access address of each fetched instruction. If the obtained opcode and access address indicate a specific access attempt to the data memory 23, the instruction monitor 200 produces a reservation request for the common control bus Bc, gives a specific priority to that request, and outputs it in the form of prioritized reservation requests R1 to Rn corresponding to the individual control buses B1 to Bn, respectively.

When a prioritized reservation request R1 to Rn has been received, and when its corresponding bus request is detected on the individual control bus B1 to Bn of a particular processor 21-1 to 21-*n*, the bus arbiter 26 sends the bus selector 24 a selection command specifying that requesting processor. In the case where two or more processors are requesting, the bus arbiter 26 specifies a processor with a higher prioritized reservation request.

Suppose, for example, that the prioritized reservation request R1 has the highest priority. When the bus arbiter 26 recognizes a bus request on the corresponding individual control bus B1 as being prioritized over others, it commands the bus selector 24 to select the individual control bus B1. According to this command, the bus selector 24 connects the individual control bus B1 with the common control bus Bc, so that the first processor 21-1 can make access to the data memory 23.

Figure 6:
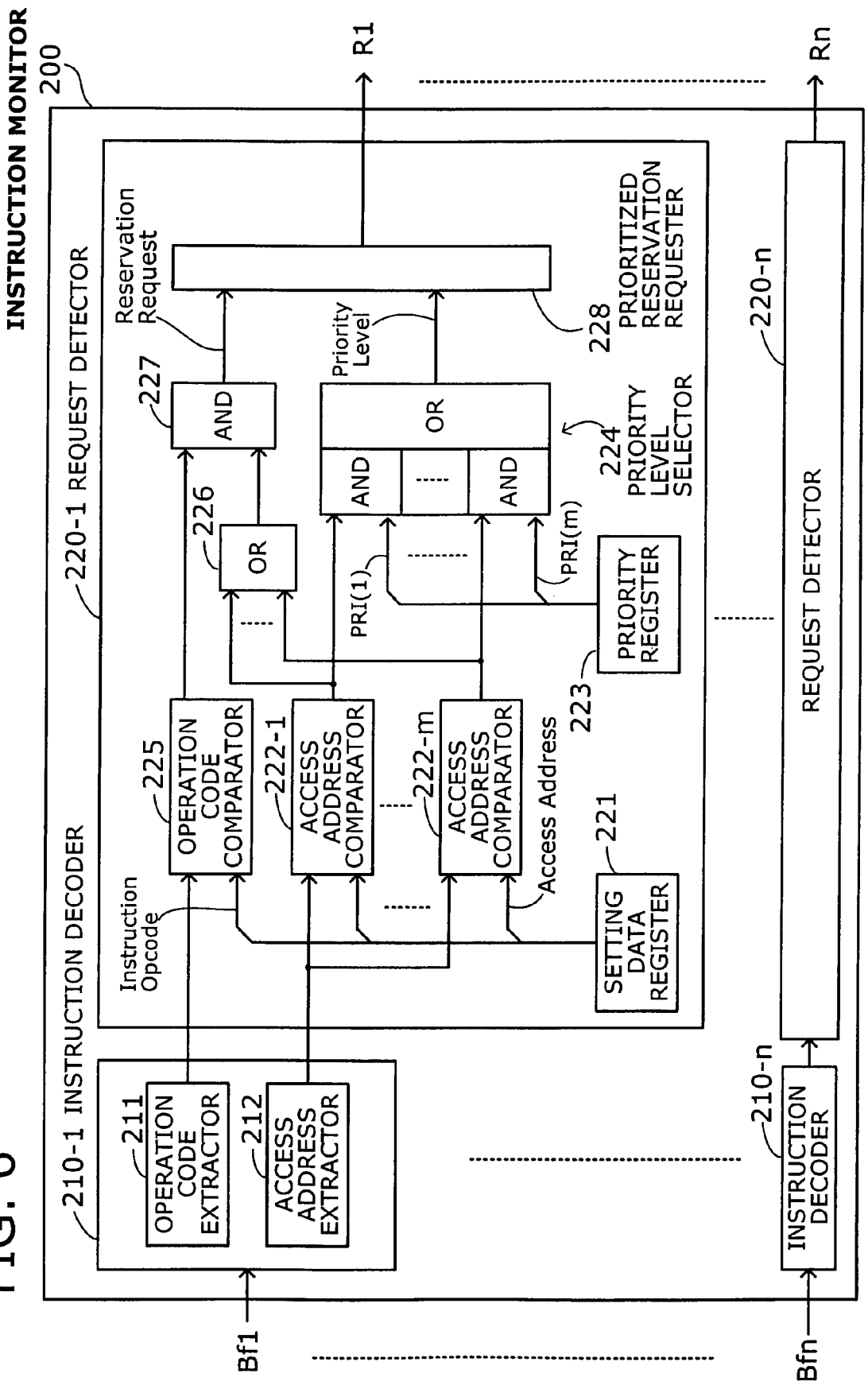
FIG. 6 shows the structure of an instruction monitor.

FIG. 6 shows the structure of the instruction monitor 200 according to the second embodiment. The instruction monitor 200 includes instruction decoders 210-1 to 210-*n* and request detectors 220-1 to 220-*n* corresponding to different fetch buses Bf1 to Bfn, respectively. The following description will focus on the first set of instruction decoder 210-1 and request detector 220-1, which serve the first fetch bus Bf1.

The instruction decoder 210-1 is formed from an opcode extractor 211 and an access address extractor 212. The opcode extractor 211 extracts an opcode from an instruction code on the fetch bus Bf1. The access address extractor 212 extracts access address from an instruction code on the fetch bus Bf1 when the processor 21-1 reads the code memory 22-1.

The request detector 220-1 is formed from a setting data register 221, access address comparators 222-1 to 222-*m*, a priority register 223, a priority level selector 224, an opcode comparator 225, an OR operator 226, an AND operator 227, and a prioritized reservation requester 228.

The setting data register 221 holds an opcode value of an instruction that may produce access to the data memory 23, as well as a plurality (m) of access address values relevant to the data memory 23. The opcode value and access address values are sent respectively to the opcode comparator 225 and access address comparators 222-1 to 222-*m*. The user can specify desired values to the setting data register 221.

The access address comparators 222-1 to 222-*m* compare the extracted access address with m access address values and outputs m comparison results. Specifically, its high level output indicates a match, while its low level output indicates a mismatch. The priority register 223 provides m different priority levels, PRI(1) to PRI(m). The user can also specify desired priority levels to the priority register 223.

The priority level selector 224 selects a priority level corresponding to a high-level signal produced by the access address comparators 222-1 to 222-*m*. Suppose, for example, that the first access address comparator 222-1 is the only comparator that outputs a high-level signal, and that the priority level PRI(1) is set to seven. In this case, the priority level selector 224 outputs a priority level of seven.

The opcode comparator 225, on the other hand, compares the extracted opcode with the opcode value provided from the setting data register 221. The AND operator 227 receives this comparison result as a high-level signal for a match and a low-level signal for a mismatch, for example. The OR operator 226 produces a logical sum of the comparison results of the access address comparators 222-1 to 222-*m*. The AND operator 227 then calculates a logical product of the output signals of the opcode comparator 225 and OR operator 226. If both signals are high, then the output of the AND operator 227 goes high, meaning that a reservation request should be asserted. The prioritized reservation requester 228 supplies the bus arbiter 26 with a prioritized reservation request R1 indicating an active reservation request and a specific priority level determined above. In the foregoing example, the prioritized reservation request R1 indicates a reservation request with a priority level of seven.

Figure 7:
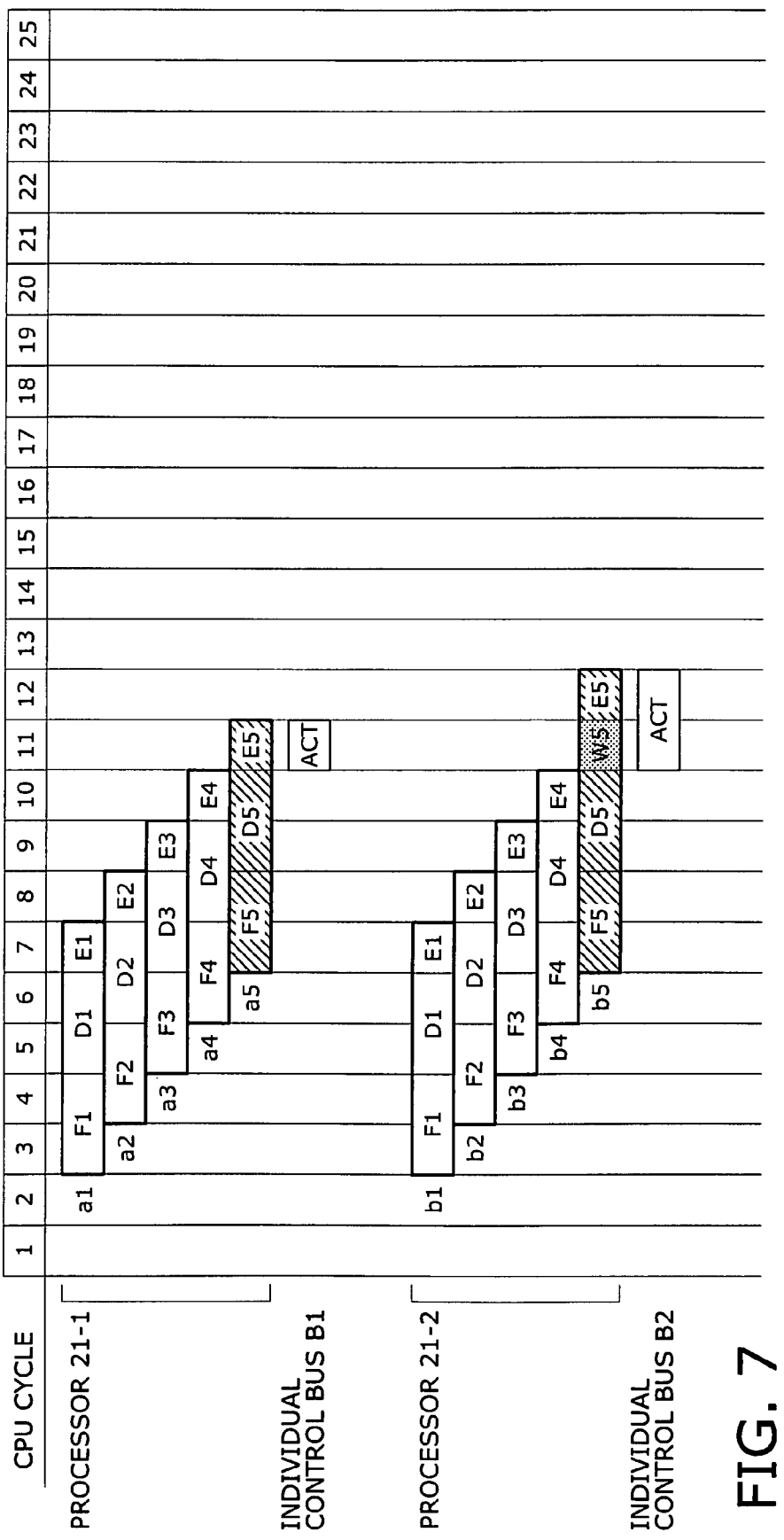
FIG. 7 is a timing diagram showing an example of pipelined processing.

Referring to the timing diagram of FIG. 7, an example of pipelined processing is shown. The upper half of FIG. 7 shows pipeline operation of the first processor 21-1, while the lower half shows that of the second processor 21-2. FIG. 7 illustrates a situation where the second processor 21-2 should wait, without the function of the second embodiment. The data processing device 20 of the second embodiment behaves differently as will be described in FIG. 8.

Referring to cycle 11 of FIG. 7, the first processor 21-1 executes operation E5 at its stage a5. On the other hand, stage b5 of the second processor 21-2 is in wait state W5. This is the case where the first processor 21-1 has a higher priority than the second processor 21-2. If it is the other way around, that is when the data processing device 20 of the second embodiment works. Specifically, the second embodiment enables the second processor 21-2 to win the common control bus Bc prior to the first processor 21-1.

Figure 8:
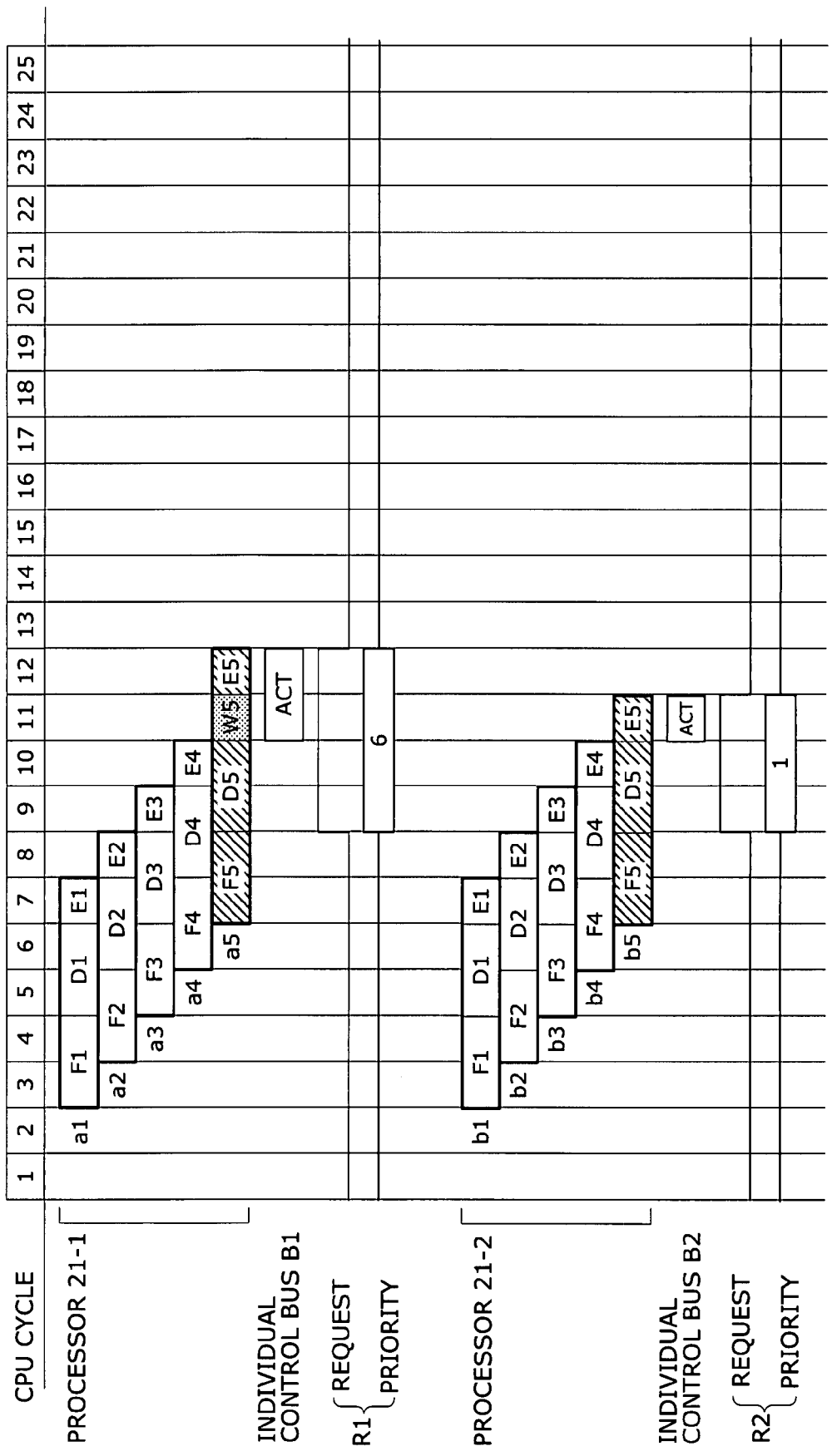
FIG. 8 is a timing diagram showing how the proposed data processing device operates according to the second embodiment.

FIG. 8 is a timing diagram showing how the proposed data processing device 20 operates. The upper half of this timing diagram shows pipeline operation of the first processor 21-1, while the lower half shows that of the second processor 21-2. Particularly, FIG. 8 illustrates a situation where the second processor 21-2 reserves the common control bus Bc by using the control technique of the second embodiment.

It is assumed in the example of FIG. 8 that lower priority values mean higher priorities. A prioritized reservation request R2 is asserted during a period from cycle 9 to cycle 11, with a priority of "1" for the second processor 21-2. This means that the second processor 21-2 is granted an access right with the top priority in advance of its actual access attempt to the data memory 23 in cycle 11. Note that this advanced arbitration happens in cycles 9 and 10, during which both processors are still in the decoding phase D5.

Referring to the timing diagram for the first processor 21-1, its prioritized reservation request R1 is asserted during a period from cycle 9 to cycle 12, with a priority level of six. Since this request R1 is lower in priority than R2, the second processor 21-2 wins the arbitration, thus performing operation E5 of stage b5 during cycle 11, whereas the first processor 21-1 goes into wait state W5 during the same period. Operation E5 at stage a5 of the first processor 21-1 actually takes place in cycle 12 after the second processor 21-2 completes its E5.

As can be seen from the above explanation, the second embodiment determines which processor can use the common control bus Bc to reach the data memory 23, according to reservation requests issued a few cycles before the actual access should take place. This advanced arbitration mechanism ensures the highest-priority processor to begin access to the data memory 23 in a fixed number of cycles.

Variation of the Second Embodiment

The data processing device 20 explained in FIG. 6 is designed to select priority according to the comparison result of access address when the processor's instruction opcode coincides with a predefined code value. This may be modified such that the access address and opcode will exchange their roles. That is, the second embodiment may have a variation where the priority is determined according to the comparison result of instruction opcode when the processor's access address coincides with a predefined address value.

Figure 9:
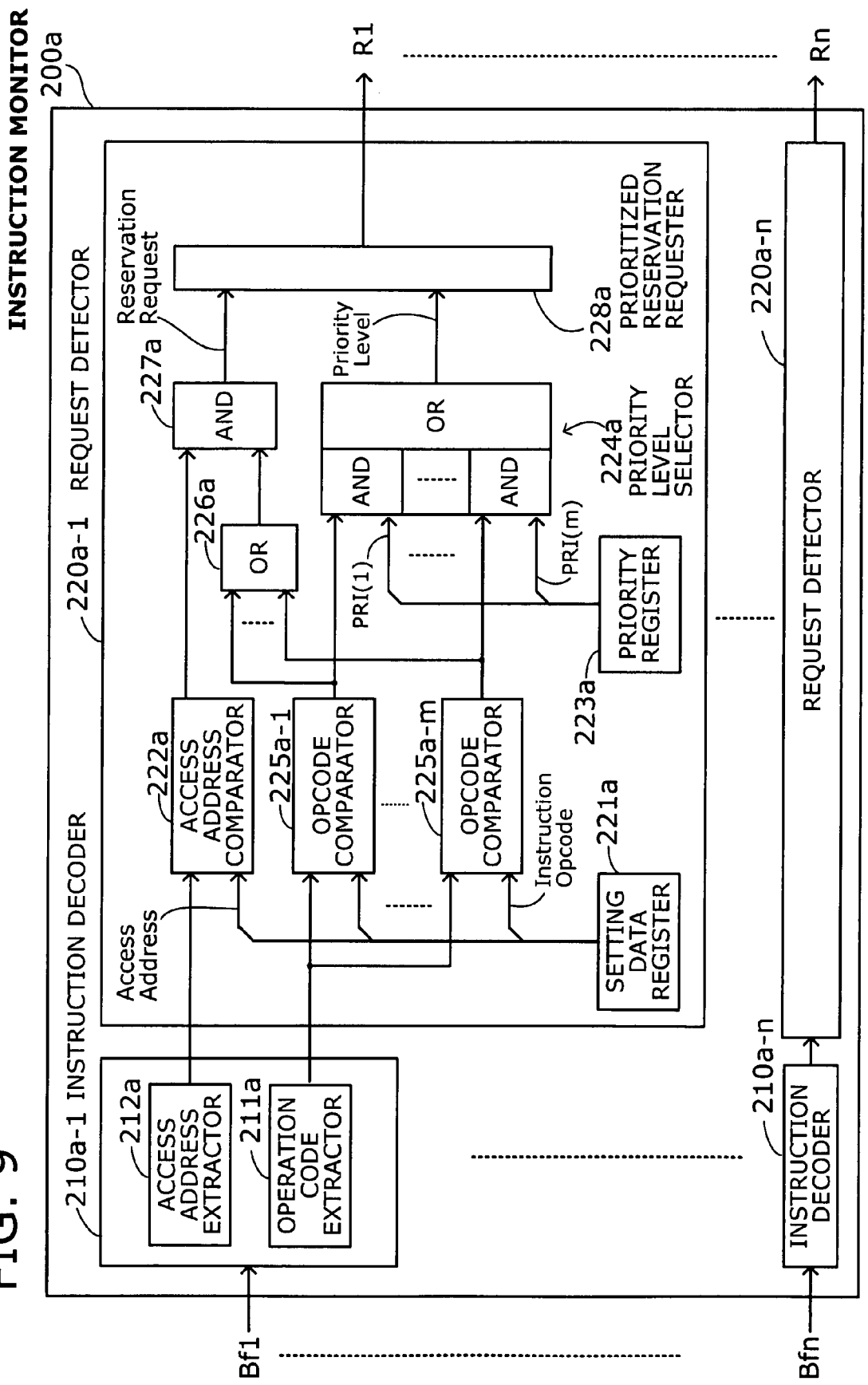
FIG. 9 shows the structure of a data processing device according to a variation of the second embodiment.

FIG. 9 shows the structure of an instruction monitor 200a according to such a variation of the second embodiment. This instruction monitor 200a includes instruction decoders 210a-1 to 210a-n and request detectors 220a-1 to 220a-n corresponding to different fetch buses Bf1 to Bfn, respectively. More specifically, the instruction decoder 210a-1 includes an opcode extractor 211a and an access address extractor 212a. The request detector 220a-1 is formed from a setting data register 221a, an access address comparator 222a, a priority register 223a, a priority level selector 224a, opcode comparators 225a-1 to 225a-m, a OR operator 226a, a AND operator 227a, and a prioritized reservation requester 228a.

The instruction monitor 200a watches instruction fetch cycles on the fetch bus Bf1 to Bfn in order to compare the opcode of each instruction with predefined opcode values. If there is a match, the instruction monitor 200a selects a specific priority previously determined for the opcode value that is matched. The instruction monitor 200a also examines access address of the instruction on the fetch bus Bf1 to Bfn and compares the observed access address with a predefined address value. If both comparison results indicate a match in opcode and access address (i.e., both the access address comparator 222a and OR operator 226a output high-level signals), the instruction monitor 200a produces a reservation request for the common control bus Bc, gives a specific priority to that request, and outputs it in the form of prioritized reservation requests R1 to Rn.

While FIG. 9 shows some other elements of the instruction monitor 200a, their functions are analogous to those explained in FIG. 6, except that it swaps the roles of instruction opcode and access address. For this reason, the detailed description of those elements will not repeated here.

Third Embodiment

Figure 10:
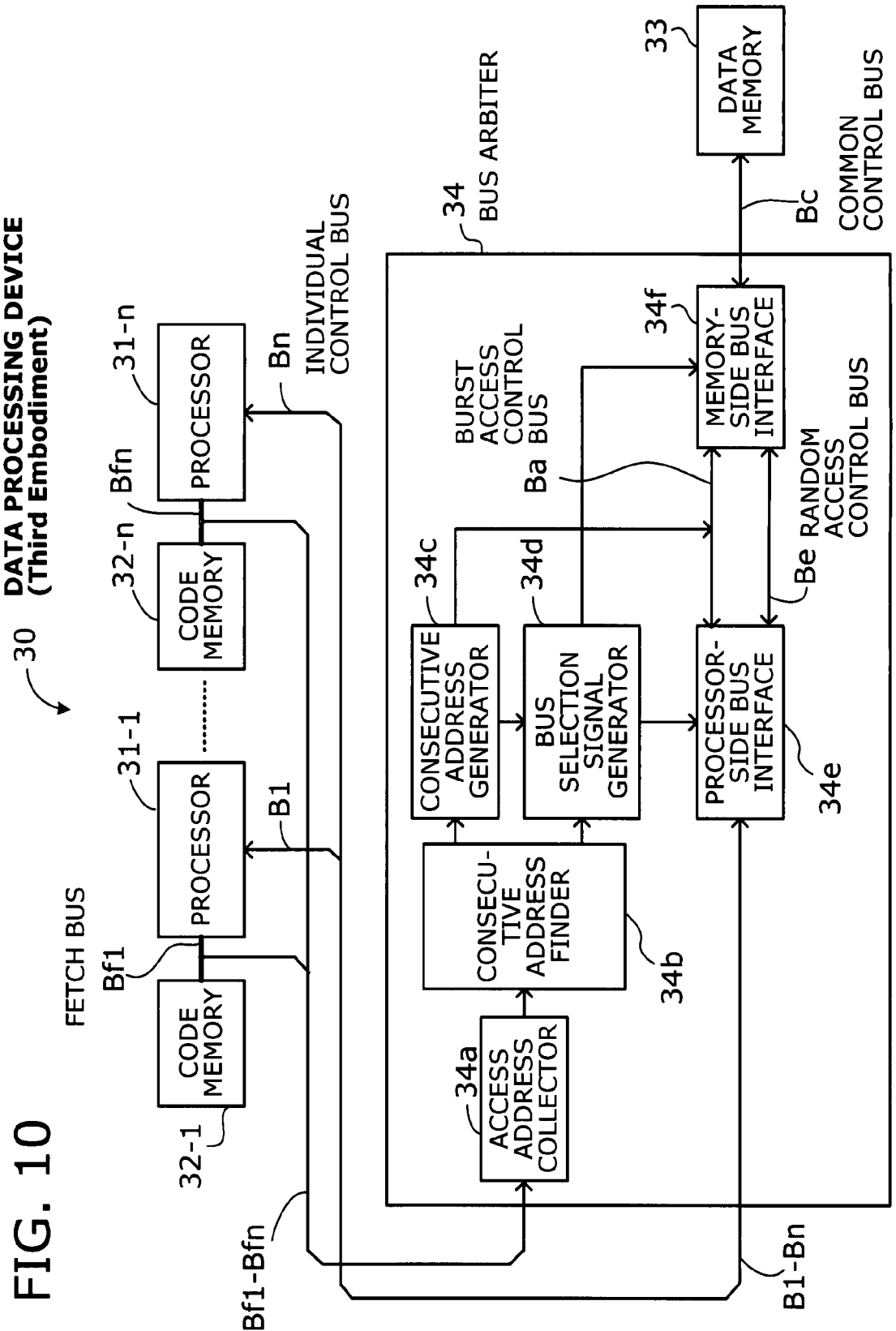
FIG. 10 shows the structure of a data processing device according to a third embodiment of the present invention, including details of a bus arbiter.

Referring now to FIG. 10, this section describes a data processing device according to a third embodiment of the present invention. The illustrated data processing device 30 includes a plurality of processors 31-1 to 31-n and their corresponding code memories 32-1 to 32-n, a data memory 33, and a bus arbiter 34. The description will focus on the bus arbiter 34, since the other elements provide the same functions as their counterparts in the first embodiment shown in FIG. 1.

The bus arbiter 34 is disposed between the processors 31-1 to 31-n and the data memory 33. It is coupled to each processor 31-1 to 31-n via individual control buses B1 to Bn, as well as to the data memory 33 via a common control bus Bc. The function of this bus arbiter 34 is to arbitrate memory access conflicts between the processors 31-1 to 31-n.

The bus arbiter 34 is formed from a burst access control bus Ba, a random access control bus Be, an access address collector 34a, a consecutive access finder 34b, a consecutive address generator 34c, a bus selection signal generator 34d, a processor-side bus interface 34e, and a memory-side bus interface 34f.

The burst access control bus Ba interconnects the consecutive address generator 34c, processor-side bus interface 34e, and memory-side bus interface 34f. The burst access control bus Ba is used to make a burst access to the data memory 33 with a consecutive series of access addresses. The random access control bus Be, on the other hand, interconnects the processor-side bus interface 34e and memory-side bus interface 34f, for use in random access to the data memory 33.

The access address collector 34a watches activities on the fetch buses Bf1 to Bfn to extract access addresses to the data memory 33 from instructions that the processors 31-1 to 31-n read out of their respective code memories 32-1 to 32-n. The consecutive access finder 34b analyzes those extracted access addresses to determine whether there exist consecutive addresses in the predetermined number of samples. If such access addresses are found, then the consecutive address generator 34c outputs them in an orderly manner over the burst access control bus Ba, and the bus selection signal generator 34d produces a bus selection signal specifying the burst access control bus Ba as a choice. Otherwise, the bus selection signal generator 34d generates a different bus selection signal that specifies the random access control bus Be.

The processor-side bus interface 34e connects the individual control bus B1 to Bn to either the burst access control bus Ba or the random access control bus Be according to a given bus selection signal, thereby allowing the requesting processor 31-1 to 31-n to reach the data memory 33 via its individual control bus B1 to Bn. The memory-side bus interface 34f connects either the burst access control bus Ba or the random access control bus Be to the common control bus Bc according to a given bus selection signal.

Figure 11:
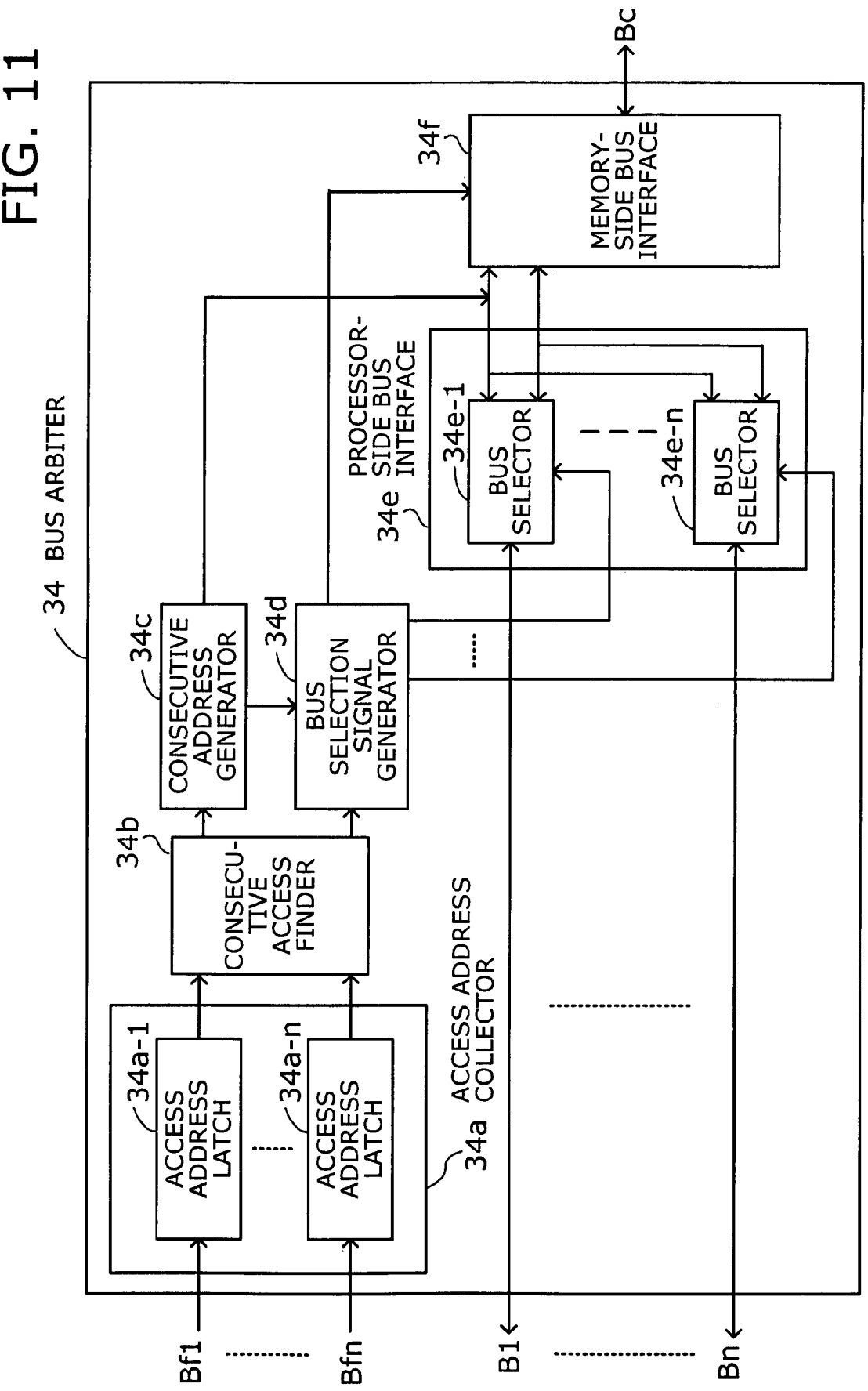
FIG. 11 gives some more details of the bus arbiter.

FIG. 11 gives some more details of the bus arbiter 34. The access address collector 34a includes a plurality of intra-instruction access address latches 34a-1 to 34a-n, and the processor-side bus interface 34e includes a plurality of bus selectors 34e-1 to 34e-n.

The intra-instruction access address latches 34a-1 to 34a-n are each coupled to the fetch buses Bf1 to Bfn. Each intra-instruction access address latch 34a-1 to 34a-n latches access address included in an instruction that acts on the data memory 33. The consecutive access finder 34b examines each predetermined number of access addresses latched in the intra-instruction access address latches 34a-1 to 34a-n, thus determining whether they include any consecutive (or potentially consecutive) addresses. If such addresses are found, then the consecutive access finder 34b extracts and reorders them to form a consecutive series of addresses. Suppose, for example, that five access discrete addresses "01," "07," "03,"

"09," and "02" are given in that order. In this case, the group of "01," "03," and "02" is found potentially consecutive, although their original order per se is not consecutive. The consecutive access finder 34b extracts those three addresses and sorts them in ascending order as follows: "01," "02," "03." The consecutive address generator 34c outputs the reordered access addresses to the burst access control bus Ba. The bus selection signal generator 34d produces a bus selection signal specifying that the burst access control bus Ba be selected.

The above bus selection signal reaches the processor-side bus interface 34e, causing bus selectors 34e-1 to 34e-n to connect the burst access control bus Ba with one of the individual control buses B1 to Bn. The bus selection signal also reaches the memory-side bus interface 34f, causing the burst access control bus Ba to be connected to the common control bus Bc.

In the case where the consecutive access finder 34b finds no consecutive addresses, the bus selection signal generator 34d produces a bus selection signal specifying the random access control bus Be. The corresponding bus selector 34e-1 to 34e-n in the processor-side bus interface 34e then connects the random access control bus Be with one of the individual control buses B1 to Bn, while the memory-side bus interface 34f connects the random access control bus Be to the common control bus Bc.

Figure 12:
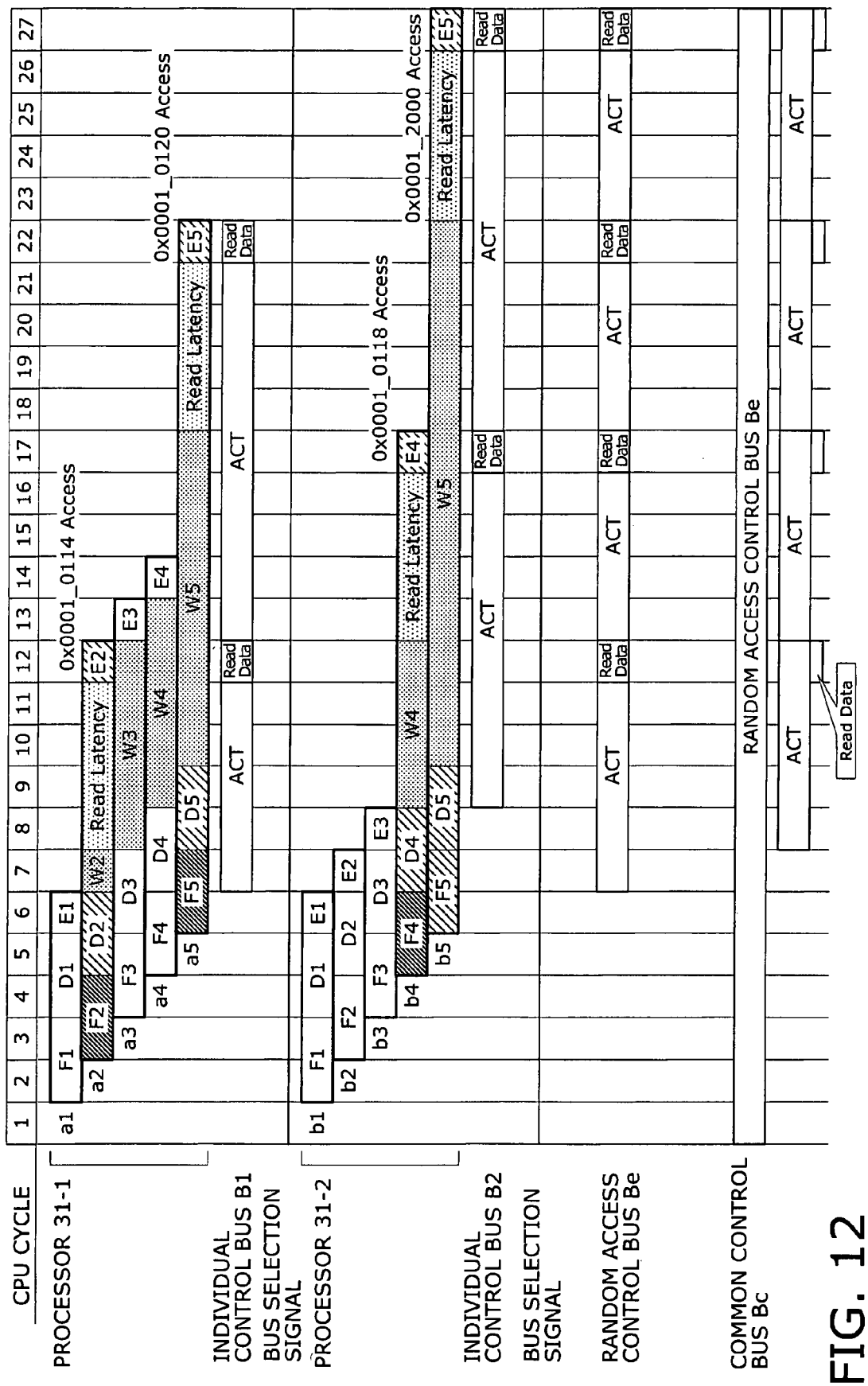
FIG. 12 is a timing diagram showing an example of pipelined processing.

FIG. 12 is a timing diagram showing an example of pipelined processing. The upper half of FIG. 12 shows pipeline operation of the first processor 31-1, while the lower half shows that of the second processor 31-2. FIG. 12 illustrates a situation where the two processors have to wait a long time for completion of each other's memory access, without the function of the third embodiment. The data processing device 30 of the third embodiment alleviates this situation as will be described in FIG. 13.

In cycle 12 of stage a2, the first processor 31-1 executes operation E2 with an access address of 0x0001_0114. In cycle 17 of stage b3, the second processor 31-2 executes operation E4 with an access address of 0x0001_0118. The first processor 31-1 also executes operation E5 with an access address of 0x0001_0120 in cycle 22 of stage a4, and the second processor 31-2 executes operation E5 in cycle 27 of stage b4 with an access address of 0x0001_2000.

The sequence of FIG. 12 makes access to the data memory 33 a few times in a random fashion, without using the above-described burst access of the third embodiment. Specifically, the first access occurs in cycle 12 for E-phase operation on address 0x0001_0114, and the fourth access occurs in cycle 27 for E-phase operation on address 0x0001_2000. It takes sixteen cycles for the processors to complete access to all the four addresses.

Figure 13:
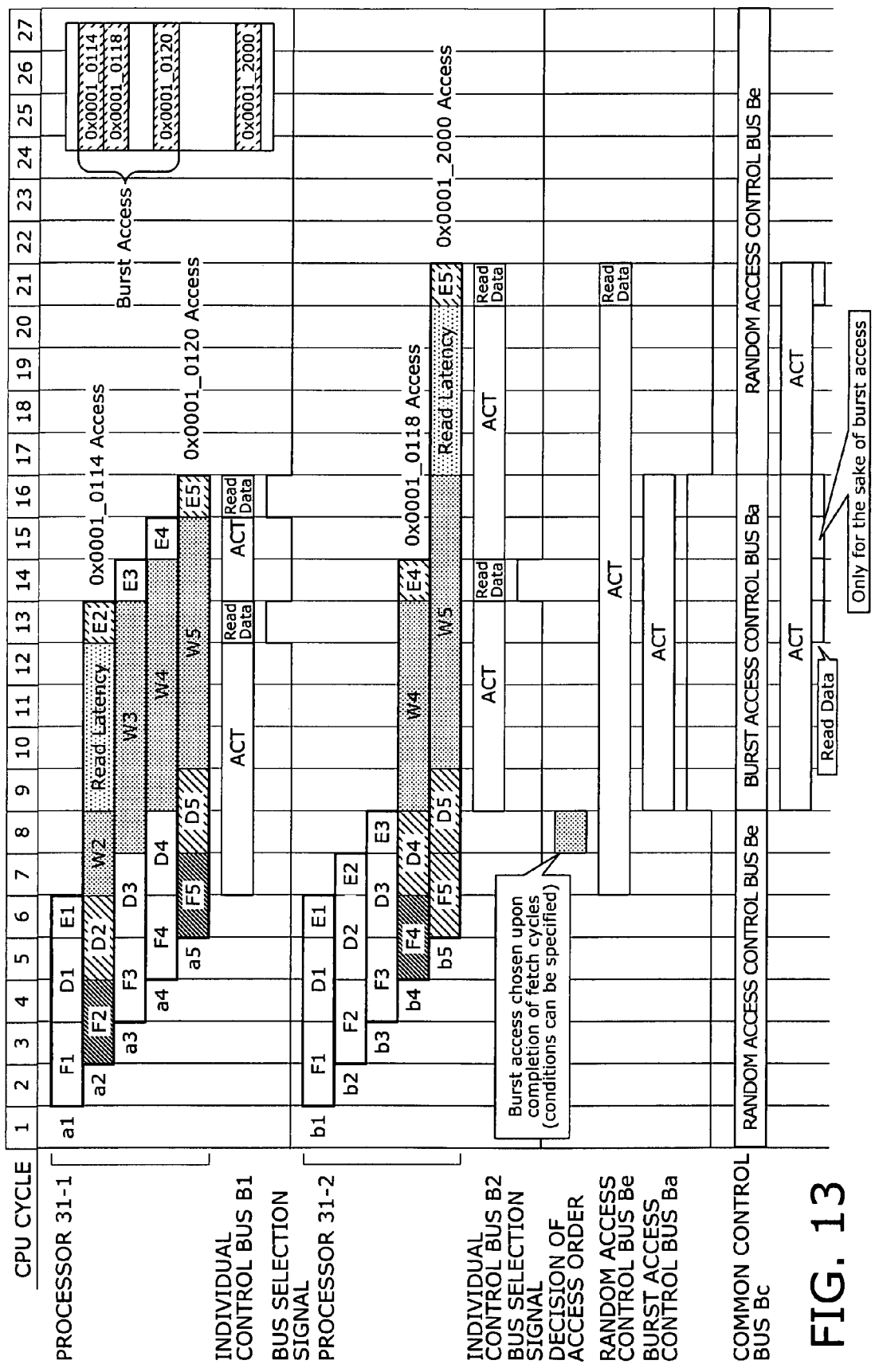
FIG. 13 is a timing diagram showing how the proposed data processing device operates according to the third embodiment.

FIG. 13 is a timing diagram showing how the proposed data processing device 30 operates according to the third embodiment. The upper half of this timing diagram shows pipeline operation of the first processor 31-1, while the lower half shows that of the second processor 31-2. Particularly FIG. 13 illustrates a situation where the proposed data processing device 30 performs burst access to the data memory 33.

Specifically, the above four access addresses are rearranged in ascending order, so that the E-phase operations will act on 0x0001_0114, 0x0001_0118, 0x0001_0120, and 0x0001_200 of the data memory 33 in that order. Note that the first three addresses are construed as consecutive, assuming an additional access address 0x0001_011c to be inserted after the second address.

The data processing device 30 chooses burst access mode at the time when the first processor 31-2 has finished an instruction fetch operation F5 at stage b5. With the burst access control bus Ba enabled, a burst access takes place on 0x0001_0114, 0x0001_0118, 0x0001_011c, and 0x0001_0120 in cycles 13, 14, 15, and 16, respectively. Here, the first and fourth cycles 13 and 16 in this burst access serve the operations E2 and E5 of the first processor 31-1, and the second cycle 14 serves the operation E4 of the second processor 31-2. Subsequently, in cycle 21, operation E5 is performed as a random memory read cycle on address 0x0001_0120. That is, the required four memory cycles complete within a period of nine cycles according to the present embodiment. This is much shorter than the case of non-burst access discussed in FIG. 12. The data processing device 30 according to the third embodiment is thus advantageous in its reduced total time of memory access.

As can be seen from the above explanation, the third embodiment of the present invention analyzes access address of processors to find a consecutive series of access addresses (or to construct a consecutive series by reordering addresses if necessary), so that a burst access can be performed on the data memory 33 through the burst access control bus Ba. This feature enables processors to complete access to the data memory 33 in a shorter time, thus reducing the chance of conflict between their bus requests.

Variation of Third Embodiment

The bus arbiter 34 of FIG. 11 is designed to extract and reorder consecutive access addresses. This design may be modified such that consecutive addresses will be bound on a block basis to make burst access. More specifically, the consecutive access finder 34b samples each fixed number of access addresses to find and sort consecutive addresses into groups corresponding to the predefined memory blocks. The consecutive address generator 34c then outputs each group of consecutive access addresses to the burst access control bus Ba on a block by block basis.

Figure 14:
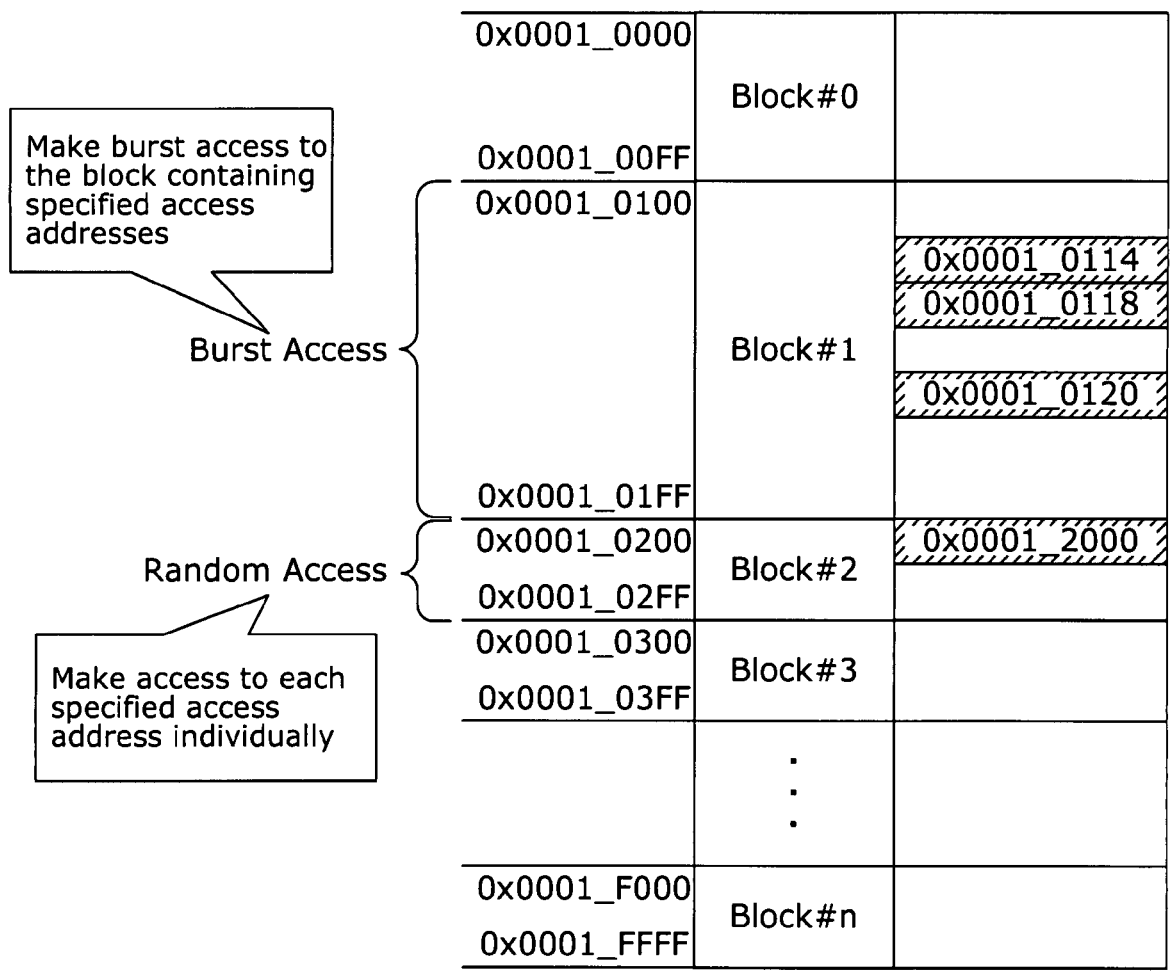
FIG. 14 shows the operation of a variation of the third embodiment.

FIG. 14 shows the operation of such a variation of the third embodiment. The consecutive access finder 34b previously divides the address space of the data memory 33 into the following blocks: block #0 (0x0001_0000 to 0x0001_00FF), block #1 (0x0001_0100 to 0x0001_01FF), block #2 (0x0001_0200 to 0x0001_02FF), . . . block #n (0x0001_F000 to 0x0001_FFFF). Suppose now that the consecutive access finder 34b has sampled access addresses of 0x0001_0114, 0x0001_0118, 0x0001_2000, and 0x0001_0120. Of those four samples, three addresses 0x0001_0114, 0x0001_0118, 0x0001_0120 will be bound for the purpose of burst access because they belong to the same block #1.

This version of the third embodiment offers the same advantages as in the original third embodiment. That is, the feature of block-based burst access reduces the chance of conflict between bus requests from processors attempting to access to the data memory 33.

Fourth Embodiment

The foregoing first to third embodiments provide the function of reducing conflict of data memory access between processors. The following fourth and fifth embodiments will intend to enhance the computational performance by reducing cache misses that the processors could encounter when they read instruction code from their respective cache memories.

Figure 15:
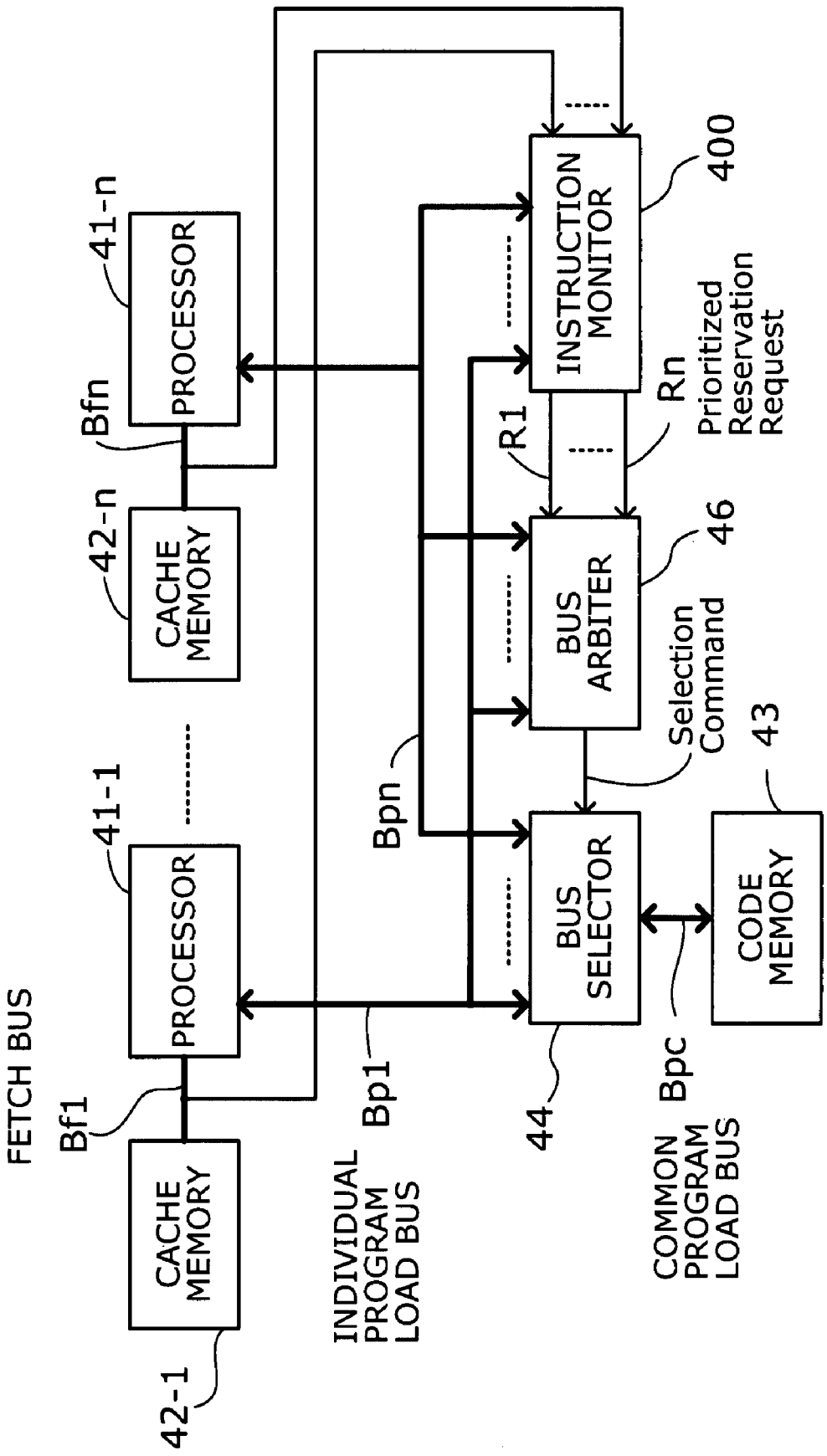
FIG. 15 shows the structure of a data processing device according to a fourth embodiment of the present invention.

FIG. 15 shows the structure of a data processing device according to a fourth embodiment of the present invention. The illustrated data processing device 40 includes a plurality of processors 41-1 to 41-n and their respective cache memories 42-1 to 42-n, a code memory 43, a bus selector 44, an instruction monitor 400, and a bus arbiter 46.

The code memory 43 is a large-capacity memory with a relatively low speed for use as instruction storage for the processors. The cache memories 42-1 to 42-n are connected to the processors 41-1 to 41-n via fetch buses Bf1 to Bfn, respectively. They are small high-speed memories for temporarily storing program instructions copied from the code memory 43.

The bus selector 44 is disposed between the processors 41-1 to 41-n and code memory 43 to connect one of individual program load buses Bp1 to Bpn with a common program load bus Bpc for access from the processors 41-1 to 41-n to the code memory 43. The bus selector 44 makes this selection in accordance with a selection command from the bus arbiter 46, thereby permitting a requesting processor to have access to the code memory 43.

The instruction monitor 400 watches instruction fetch cycles on the fetch buses Bf1 to Bfn of respective processors 41-1 to 41-n in order to obtain fetch address of the corresponding cache memories 42-1 to 42-n. The instruction monitor 400 also watches program load cycles on individual program load buses Bp1 to Bpn of the processors 41-1 to 41-n to obtain load addresses of program instructions transferred from the code memory 43 to the cache memories 42-1 to 42-n.

The instruction monitor 400 calculates an address distance between fetch address and load address. If the address distance falls below a threshold, then the instruction monitor 400 produces a reservation request for the common program load bus Bpc, gives a specific priority to that request, and outputs it in the form of prioritized reservation requests R1 to Rn.

When a prioritized reservation request has been received, and when a bus request corresponding to that reservation request is detected on the individual program load bus Bp1 to Bpn of a requesting processor 41-1 to 41-n, the bus arbiter 46 sends a selection command specifying that requesting processor to the bus selector 44. In the case where two or more processors are requesting, the bus arbiter 46 specifies one of those processors that has the highest priority.

Figure 16:
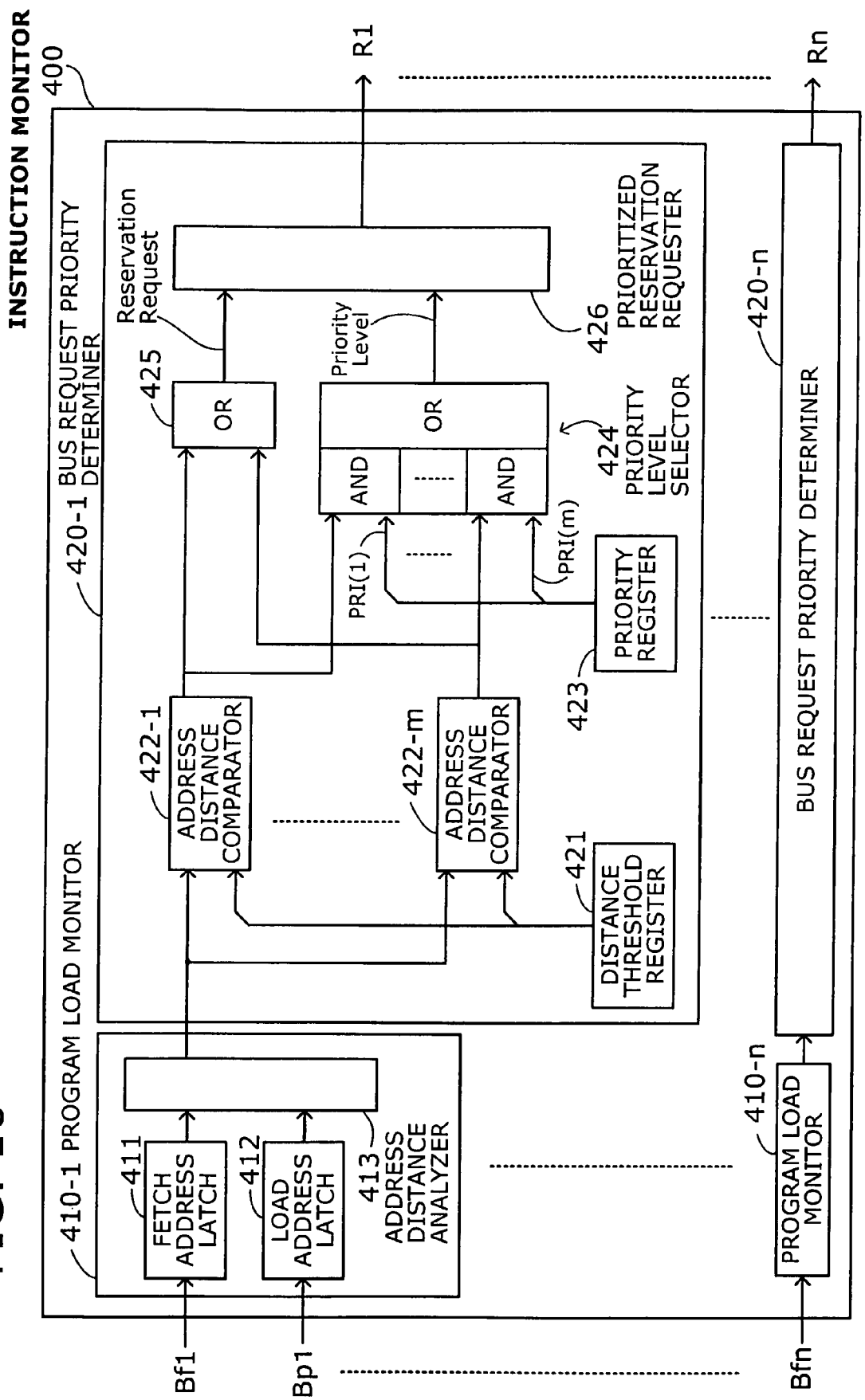
FIG. 16 shows the structure of an instruction monitor according to the fourth embodiment.

FIG. 16 shows the structure of the instruction monitor 400 according to the fourth embodiment. The instruction monitor 400 includes a plurality of program load monitors 410-1 to 410-n and their corresponding bus request priority determiners 420-1 to 420-n.

The first program load monitor 410-1 is coupled to a fetch bus Bf1 and an individual program load bus Bp1. Likewise, the nth program load monitor 410-n is coupled to a fetch bus Bfn and an individual program load bus Bpn. The following description will focus on the first set of program load monitor 410-1 and bus request priority determiner 420-1, which serve the fetch bus Bf1 and individual program load bus Bp1.

The program load monitor 410-1 is formed from a fetch address latch 411, a load address latch 412, and an address distance analyzer 413. The fetch address latch 411 extracts and latches a fetch address included in an instruction code transferred on the fetch bus Bf1. The load address latch 412 extracts and latches an access address that the first processor 41-1 places on the individual program load bus Bp1 when attempting access to the code memory 43. The address distance analyzer 413 calculates a difference between the latched fetch address and the latched load address and outputs the result as an address distance. The detailed algorithm of this address distance calculation will be described later with reference to FIG. 17.

The bus request priority determiner 420-1 is formed from a distance threshold register 421, a plurality of address distance comparators 422-1 to 422-m, a priority register 423, a priority level selector 424, an OR operator 425, and a prioritized reservation requester 426.

The distance threshold register 421 provides a plurality (m) of predetermined distance threshold values for comparison at the address distance comparators 422-1 to 422-m. The user is allowed to specify those threshold distance values to the distance threshold register 421 as necessary.

The address distance comparators 422-1 to 422-m compare the calculated address distance with the m threshold distance values and outputs m comparison results. The comparison result appears as a high-level signal for a match and a low-level signal for a mismatch, for example. The priority register 423 provides m priority levels, PRI (1) to PRI (m). The user is allowed to set desired priority levels to this priority register 423.

The priority level selector 424 selects a priority level corresponding to a high-level signal produced by the address distance comparators 422-1 to 422-m. Suppose, for example, that the first address distance comparator 422-1 is the only comparator that outputs a high-level signal, and its corresponding priority level PRI(1) is set to seven. In this case, the priority level selector 424 outputs a priority level of seven.

The OR operator 425 produces a logical sum of the comparison results of the address distance comparators 422-1 to 422-m, the output of which goes high when there is an active reservation request. The prioritized reservation requester 426 supplies the bus arbiter 46 with a prioritized reservation request R1 indicating the active reservation request and priority level determined above.

The above-described instruction monitor 400 calculates an address distance from samples of fetch address and load address and compares that address distance with predefined distance thresholds. If there is a match, the instruction monitor 400 recognizes that the address distance has reached a certain level of proximity, thus producing a reservation request with a priority corresponding to that proximity level.

Figure 17:
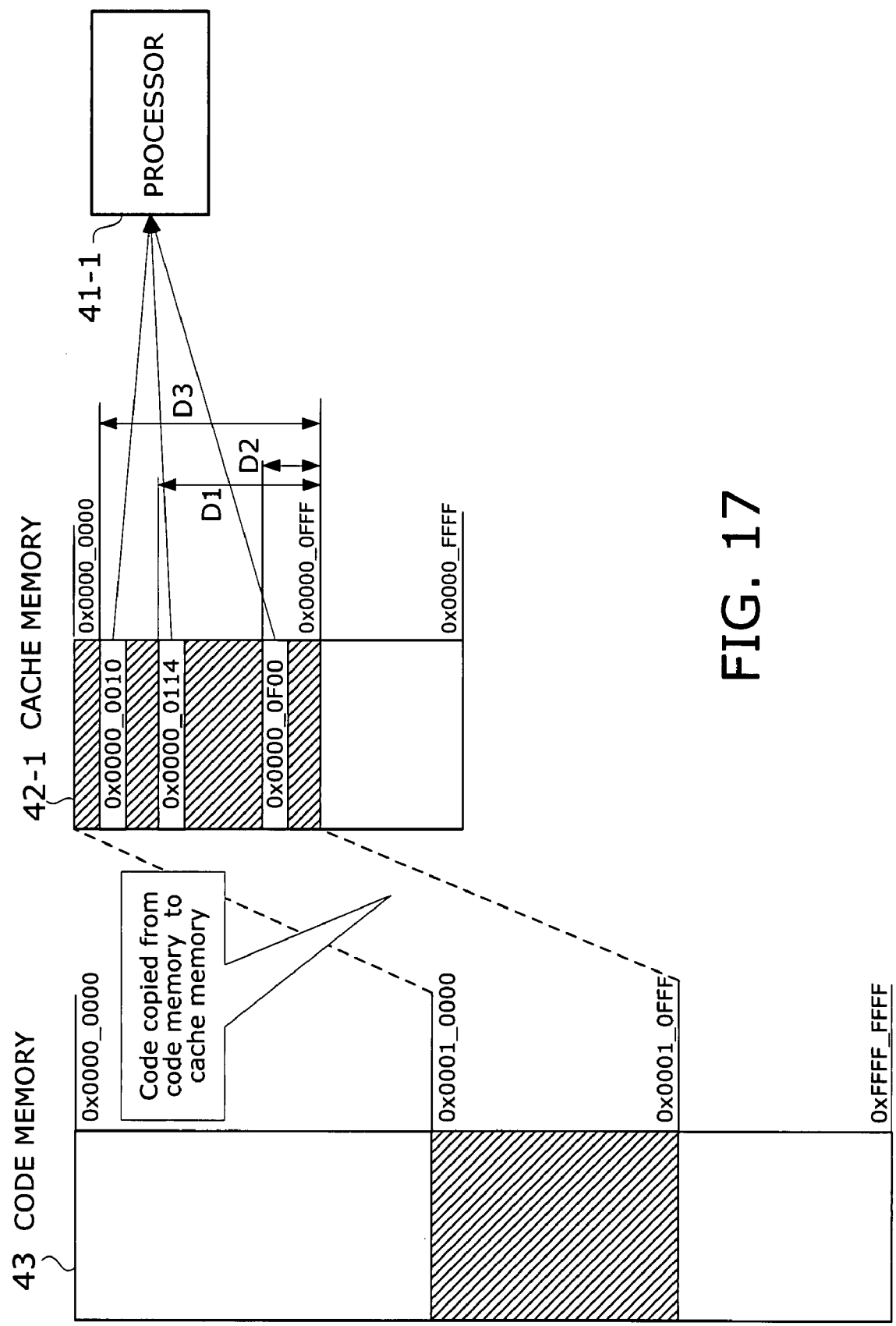
FIG. 17 shows the concept of address distance.

Referring now to FIG. 17, the concept of address distance is shown. Suppose, for example, that a segment of 0x0001_0000 to 0x0001_0FFF of the code memory 43 is currently cached in 0x0000_0000 to 0x0000_0FFF of the cache memory 42-1. The processor 41-1 fetches instructions from that segment of the cache memory 42-1. The address distance at this time refers to the distance, in the cache memory space, between the processor's fetch address and the bottom address of the cached instructions. Specifically in the present example, the bottom address of the cached instructions is 0x0001_0FFF, which corresponds to 0x0000_0FFF in the cache memory 42-1. The address distance analyzer 413 thus calculates the difference between an actual instruction fetch address and the bottom address 0x0000_0FFF.

Referring to the middle part of FIG. 17, three examples of the instruction fetch address are shown; they are: 0x0000_0114, 0x0000_0F00, and 0x0000_0010. Symbols D1, D2, and D3 represent address distances for those respective instruction fetch addresses each relative to the bottom address 0x0000_0FFF. D2 is the shortest, and if this D2 coincides with a predetermined distance threshold, it indicates to the instruction monitor 400 that the processor's fetch address has reached a certain critical point. That is, the instruction fetch is approaching the end of the cache area, and thus it could soon go beyond the bottom cache address, meaning that it is highly likely for the processor to encounter a cache miss.

As can be seen from the example of FIG. 16, the fourth embodiment uses a plurality of given distance thresholds to evaluate the address distance observed by the address distance analyzer 413, thereby recognizing how close the fetch address is to the end of the cache area. The user is allowed to define the values of such distance thresholds, as necessary, according to the likelihood of cache miss (i.e., the smaller the address distance, the sooner the processor will encounter a cache miss and consequent wait state for cache loading).

When a shorter address distance is detected, the bus request priority determiners 420-1 to 420-n in the instruction monitor 400 produce a reservation request for the common program load bus Bpc, with a raised priority for the processor that is in need of memory access for program loading. When, in turn, the observed address distance is still great, the bus request priority determiners 420-1 to 420-n lower the bus request priority of the processor in question because of the absence of imminent cache miss or imminent necessity for cache loading. Other processors are thus allowed to have access to the code memory 43 for their program loading.

Conventional data processing devices are inefficient since it is not until they encounter a cache miss that they begin loading the cache memory with necessary instructions. By contrast, the fourth embodiment of the present invention finds a processor with the imminent possibility of cache miss and proactively requests bus access for program loading. Therefore, the fourth embodiment greatly reduces the duration of cache miss state (i.e., time for waiting for the cache to load new codes), thus enhancing the efficiency of computation and the performance of the system.

Fifth Embodiment

Figure 18:
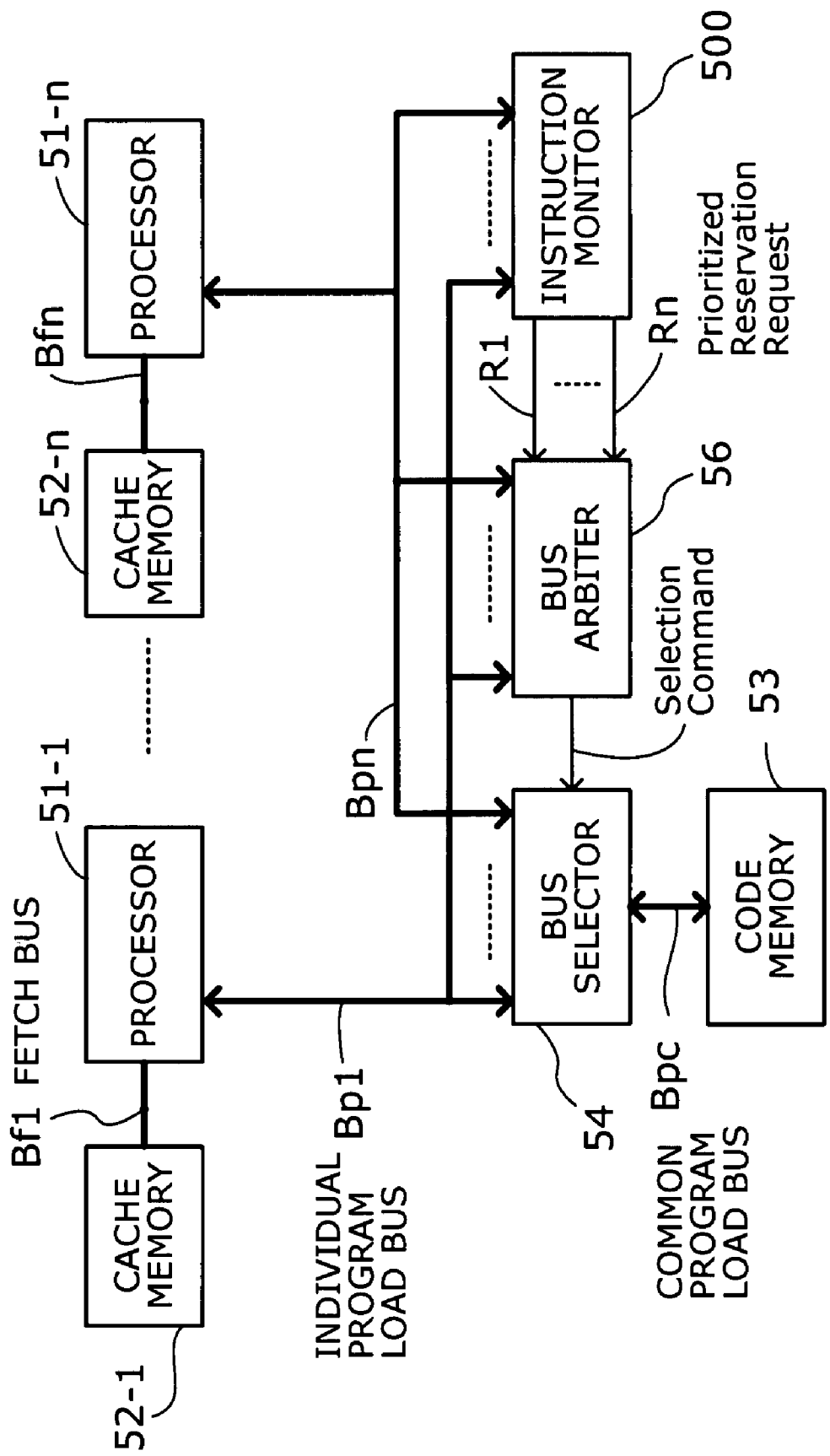
FIG. 18 shows the structure of a data processing device according to a fifth embodiment of the present invention.

FIG. 18 shows the structure of a data processing device according to a fifth embodiment of the present invention. This data processing device 50 includes the following elements: a plurality of processors 51-1 to 51-n and corresponding cache memories 52-1 to 52-n, a code memory 53, a bus selector 54, an instruction monitor 500, and a bus arbiter 56.

The code memory 53 is a large-capacity memory with a relatively low speed for use as instruction storage for the processors 51-1 to 51-n. The cache memories 52-1 to 52-n are connected to the processors 51-1 to 51-n via fetch buses Bf1 to Bfn, respectively. They are small high-speed memories for temporarily storing program instructions copied from the code memory 53.

The bus selector 54 is disposed between the processors 51-1 to 51-n and code memory 53 to connect one of individual program load buses Bp1 to Bpn with a common program load bus Bpc for access from the processors 51-1 to 51-n to the code memory 53. The bus selector 54 makes this selection in accordance with a selection command from the bus arbiter 56, thereby permitting a requesting processor to have access to the code memory 53.

The instruction monitor 500 watches program load cycles on individual program load buses Bp1 to Bpn of the processors 51-1 to 51-n to count the number of accesses made to load addresses of program instructions, which are read out of the code memory 53 to the cache memory 52-1 to 52-n. If the count result (i.e., load access count) is not greater than a predetermined threshold, the instruction monitor 500 produces a reservation request for the common program load bus Bpc, gives a specific priority to that request, and outputs it in the form of prioritized reservation requests R1 to Rn.

When a prioritized reservation request has been received, and when a bus request corresponding to that reservation request is detected on the individual program load bus Bp1 to Bpn of a requesting processor 51-1 to 51-n, the bus arbiter 56 sends a selection command specifying the requesting processor to the bus selector 54. In the case where two or more processors are requesting, the bus arbiter 56 specifies one of those processors that has the highest priority.

Figure 19:
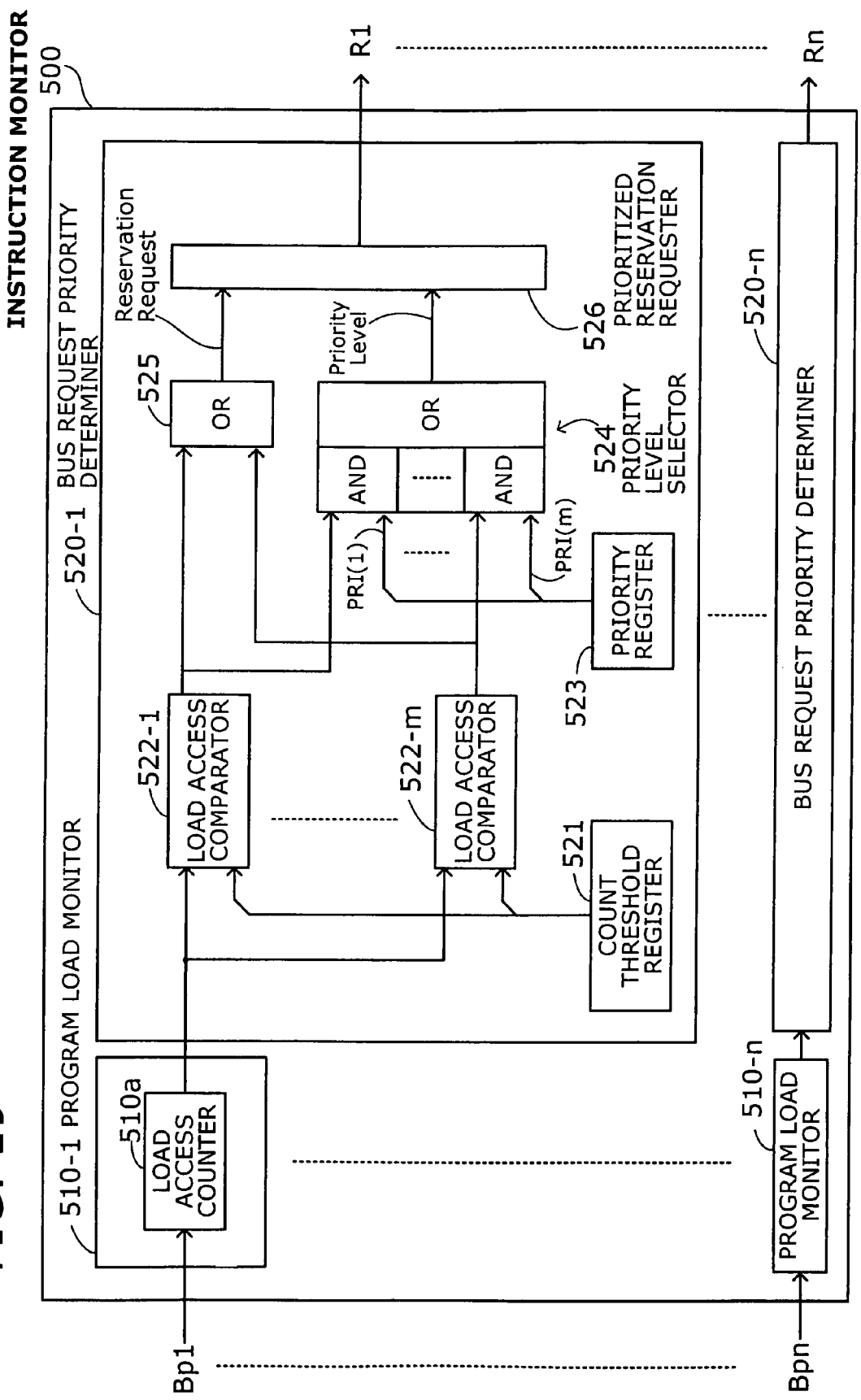
FIG. 19 shows the structure of an instruction monitor according to the fifth embodiment.

FIG. 19 shows the structure of the instruction monitor 500. The instruction monitor 500 has a plurality of program load monitors 510-1 to 510-n and corresponding bus request priority determiners 520-1 to 520-n. Each program load monitor 510-1 to 510-n is connected to a corresponding individual program load bus Bp1 to Bpn. The following description will focus on the first set of program load monitor 510-1 and bus request priority determiner 520-1.

The program load monitor 510-1 includes a load access counter 510a to count the corresponding processor's access to the code memory 53 that is made for cache loading. The bus request priority determiner 520-1 is formed from a count threshold register 521, load access comparators 522-1 to 522-m, a priority register 523, a priority level selector 524, an OR operator 525, and a prioritized reservation requester 526.

The count threshold register 521 holds a plurality (m) of threshold values for comparison of the load access count. Those access count threshold values are sent respectively to the load access comparator 522-1 to 522-m. The user is allowed to set desired threshold values to the count threshold register 521.

The load access comparator 522-1 to 522-m compare the load access count with the m threshold values and outputs m comparison results. The comparison result signal goes high for a match and low for a mismatch, for example. The priority register 523 provides m different priority levels, PRI(1) to PRI(m). The user is allowed to set desired priority levels to this priority register 523.

The priority level selector 524 selects a priority level corresponding to a high-level signal produced by the load access comparators 522-1 to 522-m. Suppose, for example, that the first load access comparator 522-1 is the only comparator that outputs a high-level signal, and its corresponding priority level PRI(1) is set to seven. In this case, the priority level selector 524 outputs a priority level of seven. The OR operator 525 produces a logical sum of the comparison results of the load access comparator 522-1 to 522-m, the output of which goes high when there is an active reservation request. The prioritized reservation requester 526 supplies the bus arbiter 56 with a prioritized reservation request R1 indicating the active reservation request and priority level determined above.

With the above-described elements, the instruction monitor 500 compares an obtained load access count with predetermined thresholds. If there is a match, that threshold value tells the instruction monitor 500 how much program code is cached. The instruction monitor 500 selects one of the priority values that corresponds to that match, thus producing a reservation request with a priority level corresponding to the access count threshold.

Figure 20:
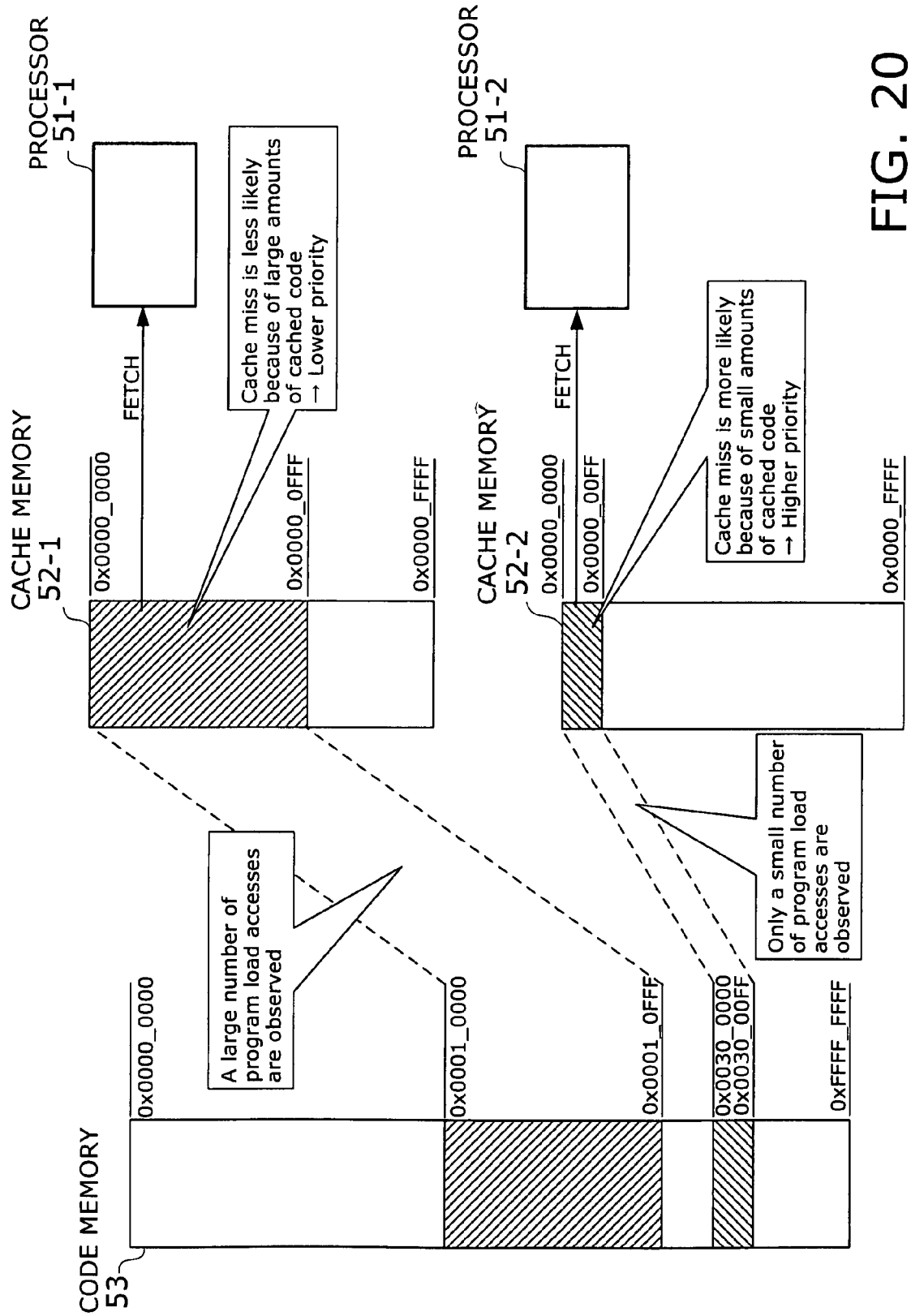
FIG. 20 explains how the likelihood of cache miss varies with program load access to a code memory.

FIG. 20 explains how the likelihood of cache miss varies with the number of program load accesses to the code memory 53. The upper middle part of FIG. 20 shows a cache memory 52-1 containing program code in 0x0000_0000 to 0x0000_0FFF, which has been loaded from 0x0001_0000 to 0x0001_0FFF of the code memory 53. This is an example case where the instruction monitor 500 observes a large number of program loading cycles. Because of this large cache area containing valid code, it is less likely for the first processor 51-1 to experience cache miss events. The first processor 51-1 is thus given a lower priority in its bus access for program loading.

On the other hand, the lower middle part of FIG. 20 shows another example case, where the cache memory 52-2 for the second processor 51-2 contains a relatively small amount of program code in 0x0000_0000 to 0x0000_00FF. This cache area has been loaded from 0x0030_0000 to 0x0030_00FF of the code memory 53. Due to this small cache area, there is a greater chance for the second processor 51-2 to encounter a cache miss. A higher priority will be given to the second processor 51-2 for this reason.

FIG. 21 shows relationships between the number of program load accesses, bus access priority for program loading, and likelihood of cache miss. A large number of memory accesses for loading programs means a smaller chance of cache miss, which justifies lowering the bus access priority for program loading. Reversely, a small number of memory accesses for loading programs means a greater chance of cache miss, which justifies raising the priority.

As can be seen from FIG. 21, the likelihood of cache miss is increased when the cache memory stores only a small amount of cached program code. This situation can be identified as a small program load access count. The bus request priority determiners 520-1 to 520-*n* in the instruction monitor 500 are therefore designed to produce a common program load bus reservation request in the fear that the processor might stop soon to load its cache memory with necessary codes. This raises the priority of the corresponding individual program load bus, so that the starving processor can load its program codes faster than other processors.

On the other hand, when many program load accesses are observed, it means that a large portion of the program is loaded into a cache memory 52-1 to 52-*n*. It is less likely for the processor to incur a cache miss or have to stop and load its cache memory with necessary codes. The bus request priority determiners 520-1 to 520-*n* therefore produce a common program load bus reservation request with a lowered priority of a corresponding individual program load bus, thus prioritizing other processors' program load access.

As can be seen from the above, the fifth embodiment determines priority of processors in loading their cache memory with program code, based on the number of accesses to load address. The proposed data processing device reduces the time for loading the cache memory of each processor, thus enhancing the efficiency of computation and the performance of the system.

CONCLUSION

To summarize the above discussion, the present invention provides a data processing device that monitors activities on the individual control bus to count bus requests and their conflicts for use in determining the priority of each processor attempting access to data memory. Since a wait command signal is issued to low-priority processors to delay their operation, it is possible to reduce the number of conflicts of data memory access from processors, as well as improving the efficiency of computation.

Advantageously, the present invention reduces instruction stalls by alleviating bus request conflicts between processors when they attempt access to a shared data memory. The present invention also reduces the number and time of memory read/write operations by reordering access requests from processors to the data memory. Further, the present invention controls access to a code memory to load cache memories with necessary instructions, thus reducing each processor's wait time after a cache miss.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A processor access control device comprising:
a plurality of processors that perform computational operations;
a data memory storing data required for the computational operations;
a plurality of individual control buses extending from the respective processors toward the data memory;
a common control bus connected to the data memory;
a bus selector, disposed between the individual control buses and the common control bus, that connects the common control bus with one of the individual control buses specified by a given selection command;
a bus arbiter that resolves bus requests on the individual control buses from the processors attempting access to the data memory and sends a selection command to the bus selector;
a bus monitor that counts the bus requests and conflicts therebetween, determines priority of each processor attempting access to the data memory according to the count results, and sends a wait command signal to low-priority processors so as to delay access thereof to the data memory.

2. The processor access control device according to claim 1, wherein the bus monitor uses the count results to identify a processor that has issued a smaller number of bus requests and has encountered a fewer conflicts, and sends the wait command signal to that processor as one of the low-priority processors.

3. A processor access control device comprising:
a plurality of processors that perform computational operations;
a data memory storing data required for the computational operations;
a plurality of code memories storing instructions for the processors corresponding thereto;
a plurality of fetch buses connecting each processor with the code memory corresponding thereto;
a plurality of individual control buses extending from the respective processors toward the data memory;
a common control bus connected to the data memory;
a bus selector, disposed between the individual control buses and the common control bus, that connects the common control bus with one of the individual control buses specified by a given selection command;
an instruction monitor that watches instruction fetch cycles on the fetch bus of each processor to obtain an opcode and access address of each fetched instruction, identifies an access attempt to the data memory by examining the obtained opcode and access address, produces a reservation request for the common control bus, gives a priority to the reservation request, and outputs the prioritized reservation request in advance of executing the access attempt; and
a bus arbiter that sends the bus selector a selection command specifying one of the processors that has a higher priority than others when bus requests corresponding to the prioritized reservation requests are found on the individual control buses.

4. The processor access control device according to claim 3, further comprising:

a setting data register that receives and holds an opcode value of an instruction that may produce access to the data memory, as well as access address values relevant to the data memory; and a priority register that receives and holds priority values corresponding to the access address values;

wherein the instruction monitor finds a match between the obtained access address and the access address values held in the setting data register, selects one of the priority values that corresponds to that match, and if the obtained opcode also matches with the opcode value held in the setting data register, produces a prioritized reservation request with the selected priority value.

5. The processor access control device according to claim 3, further comprising:

a setting data register that receives and holds opcode values of instructions that may produce access to the data memory, as well as an access address value relevant to the data memory; and a priority register that receives and holds priority values corresponding to the instruction opcode values;

wherein the instruction monitor finds a match between the obtained opcode and the opcode values held in the setting data register, selects one of the priority values that corresponds to that match, and if the obtained access address also matches with the access address value held in the setting data register, produces a prioritized reservation request with the selected priority value.

6. A processor access control device comprising:

a plurality of processors that perform computational operations;

a data memory storing data required for the computational operations;

a plurality of code memories storing instructions for the processors corresponding thereto;

a plurality of fetch buses connecting each processor with the corresponding code memory;

a plurality of individual control buses extending from the respective processors toward the data memory;

a common control bus connected to the data memory; and a bus arbiter disposed between the processors and the data memory to arbitrate memory access conflicts between the processors, the bus arbiter being coupled to the processors via the individual control buses, as well as to the data memory via the common control bus;

wherein the bus arbiter comprises:

a burst access control bus for use in burst access to the data memory with a consecutive series of access addresses;

a random access control bus for use in random access to the data memory;

an access address collector that watches activities on the fetch buses to extract a predetermined number of access addresses to the data memory from instructions that the processors read out of the corresponding code memories;

a consecutive access finder that analyzes the extracted access addresses to determine whether there exists consecutive addresses in the extracted access addresses;

a consecutive address generator that outputs a series of consecutive access addresses to the burst access control bus if the consecutive access finder has found consecutive access addresses;

a bus selection signal generator that produces a bus selection signal specifying the burst access control bus if the consecutive access finder has found consecutive access addresses, and otherwise generates a bus selection signal specifying the random access control bus;

a processor-side bus interface that connects one of the individual control buses to either the burst access control bus or the random access control bus according to the bus selection signal produced by the bus selection signal generator; and a memory-side bus interface that connects either the burst access control bus or the random access control bus to the common control bus according to the bus selection signal produced by the bus selection signal generator.

7. The processor access control device according to claim 6, wherein:

the consecutive access finder extracts and reorders access addresses to form a series of consecutive access addresses; and the consecutive address generator outputs the series of consecutive access addresses to the burst access control bus.

8. The processor access control device according to claim 6, wherein:

the consecutive access finder sorts the extracted access addresses into groups corresponding to predefined blocks of the data memory; and the consecutive address generator outputs each group of access addresses to the burst access control bus on a block by block basis.

9. A processor access control device comprising:

a plurality of processors that perform computational operations;

a code memory storing instructions for the processors;

a common program load bus connected to the code memory;

a plurality of individual program load buses extending from the processors toward the code memory;

a plurality of cache memories serving the processors as temporary storage of instructions loaded from the code memory;

a plurality of fetch buses connecting each processor with the cache memory corresponding thereto;

a bus selector that connects the common program load bus with one of the individual program load buses that is specified by a given selection command;

an instruction monitor that watches instruction fetch cycles on the fetch bus of each processor to obtain fetch address of the cache memories, watches program load cycles on the individual program load bus to obtain load addresses of program instructions transferred from the code memory to the cache memories, calculates an address distance between the fetch address and the load address, and if the address distance falls below a given threshold, then produces a reservation request for the common program load bus, gives a specific priority to the reservation request, and outputs the prioritized reservation request; and a bus arbiter that sends the bus selector a selection command specifying one of the processors that has a higher priority than others when bus requests corresponding to the prioritized reservation requests are found on the individual program load buses.

10. The processor access control device according to claim 9, further comprising:

a distance threshold register that receives and holds predetermined distance thresholds for comparison of the address distance; and a priority register that receives and holds priority values corresponding to the distance thresholds;

wherein the instruction monitor finds a match between the calculated address distance and predefined distance thresholds held in the distance threshold register, selects one of the priority values that corresponds to that match, and produces a prioritized reservation request with the selected priority value.

11. A processor access control device comprising:
a plurality of processors that perform computational operations;
a code memory storing instructions for the processors;
a common program load bus connected to the code memory;
a plurality of individual program load buses extending from the processors toward the code memory;
a plurality of cache memories serving the processors as temporary storage of instructions loaded from the code memory;
a plurality of fetch buses connecting each processor with the cache memory corresponding thereto;
a bus selector that connects the common program load bus with one of the individual program load buses that is specified by a given selection command;
an instruction monitor that watches program load cycles on the individual program load bus of each processor to count the number of accesses made to load program instructions, and if the count result falls below a given threshold, then produces a reservation request for the common program load bus, gives a specific priority to the reservation request, and outputs the prioritized reservation request; and
a bus arbiter that sends the bus selector a selection command specifying one of the processors that has a higher priority than others when bus requests corresponding to the prioritized reservation requests are found on the individual program load buses.

12. The processor access control device according to claim 11, further comprising:
a count threshold register that receives and holds predetermined count thresholds for comparison of the count result; and
a priority register that receives and holds priority values corresponding to the count thresholds;

wherein the instruction monitor finds a match between the count result and the predefined count thresholds held in the count threshold register, selects one of the priority values that corresponds to that match, and produces a prioritized reservation request with the selected priority value.

13. A processor access control device comprising:
a plurality of processors that perform computational operations;
a data memory storing data required for the computational operations;
a plurality of individual control buses extending from the respective processors toward the data memory;
a common control bus connected to the data memory;
a bus selector, disposed between the individual control buses and the common control bus, that connects the common control bus with one of the individual control buses specified by a given selection command;
a bus arbiter that resolves bus requests on the individual control buses from the processors attempting access to the data memory and sends a selection command to the bus selector;
a bus monitor that counts the bus requests and conflicts therebetween, determines priority of each processor attempting access to the data memory according to the count results, and sends a wait command signal to low-priority processors so as to delay access thereof to the data memory,
wherein the low-priority processors receiving the wait command signal issue the bus request later than originally intended and higher-priority processors make access to its the data memory during a time lag.

14. The processor access control device according to claim 13, wherein the bus monitor uses the count results to identify a processor that has issued a smaller number of bus requests and has encountered a fewer conflicts, and sends the wait command signal to that processor as one of the low-priority processors.

* * * * *